(12) United States Patent
Cooley et al.

(10) Patent No.: US 11,088,556 B2
(45) Date of Patent: Aug. 10, 2021

(54) POWER SYSTEM FOR HIGH TEMPERATURE APPLICATIONS WITH RECHARGEABLE ENERGY STORAGE

(71) Applicant: FASTCAP SYSTEMS CORPORATION, Boston, MA (US)

(72) Inventors: John J. Cooley, Boston, MA (US); Riccardo Signorelli, Boston, MA (US); Morris Green, Brighton, MA (US); Padmanaban Sasthan Kuttipillai, Malden, MA (US); Christopher John Sibbald Deane, Boston, MA (US); Lindsay A. Wilhelmus, Cambridge, MA (US)

(73) Assignee: FASTCAP SYSTEMS CORPORATION, Boston, MA (US)

( * ) Notice: Subject to any disclaimer, the term of this patent is extended or adjusted under 35 U.S.C. 154(b) by 0 days.

(21) Appl. No.: 15/930,069

(22) Filed: May 12, 2020

(65) Prior Publication Data
US 2020/0280202 A1 Sep. 3, 2020

Related U.S. Application Data

(63) Continuation of application No. 15/918,908, filed on Mar. 12, 2018, now Pat. No. 10,673,264, which is a
(Continued)

(51) Int. Cl.
*H02J 7/00* (2006.01)
*H01G 11/58* (2013.01)
(Continued)

(52) U.S. Cl.
CPC ........ *H02J 7/0068* (2013.01); *E21B 41/0085* (2013.01); *H01G 2/065* (2013.01);
(Continued)

(58) Field of Classification Search
USPC ........................................................ 320/130
See application file for complete search history.

(56) References Cited

U.S. PATENT DOCUMENTS 3,982,182 A 9/1976 Hogg
4,349,910 A 9/1982 Belz
(Continued)

FOREIGN PATENT DOCUMENTS

CN 1096611 A 12/1994
CN 101395748 A 3/2009
(Continued)

OTHER PUBLICATIONS

An, et al., "Supercapacitors Using Single-Walled Carbon Nanotube Electrodes", Advanced Materials, Apr. 2001, pp. 497-500, vol. 13, No. 7.
(Continued)

*Primary Examiner* — Bryce M Aisaka

(57) ABSTRACT

A power system adapted for supplying power in a high temperature environment is disclosed. The power system includes a rechargeable energy storage that is operable in a temperature range of between about seventy degrees Celsius and about two hundred and fifty degrees Celsius coupled to a circuit for at least one of supplying power from the energy storage and charging the energy storage; wherein the energy storage is configured to store between about one one hundredth (0.01) of a joule and about one hundred megajoules of energy, and to provide peak power of between about one one hundredth (0.01) of a watt and about one hundred megawatts, for at least two charge-discharge cycles. Methods of use and fabrication are provided. Embodiments of additional features of the power supply are included.

18 Claims, 16 Drawing Sheets

Related U.S. Application Data continuation of application No. 14/792,726, filed on Jul. 7, 2015, now Pat. No. 9,954,382, which is a continuation of application No. 14/683,475, filed on Apr. 10, 2015, now abandoned, which is a continuation of application No. 13/480,085, filed on May 24, 2012, now Pat. No. 9,013,144, which is a continuation-in-part of application No. 12/928,896, filed on Dec. 21, 2010, now Pat. No. 8,760,851.

(60) Provisional application No. 61/620,364, filed on Apr. 4, 2012, provisional application No. 61/537,360, filed on Sep. 21, 2011, provisional application No. 61/494,332, filed on Jun. 7, 2011, provisional application No. 61/493,039, filed on Jun. 3, 2011, provisional application No. 61/489,389, filed on May 24, 2011.

(51) Int. Cl.
| | |
|---|---|
| *H01G 11/62* | (2013.01) |
| *H01G 11/08* | (2013.01) |
| *H01M 10/42* | (2006.01) |
| *H01M 50/10* | (2021.01) |
| *H01M 10/39* | (2006.01) |
| *E21B 41/00* | (2006.01) |
| *H01G 2/06* | (2006.01) |
| *H01G 11/10* | (2013.01) |
| *H01G 11/14* | (2013.01) |
| *H01G 11/32* | (2013.01) |
| *H01G 11/60* | (2013.01) |
| *H01G 11/78* | (2013.01) |
| *H01M 10/44* | (2006.01) |
| *H01M 10/46* | (2006.01) |
| *H01M 10/48* | (2006.01) |
| *H01M 16/00* | (2006.01) |
| *H01G 11/36* | (2013.01) |
| *B82Y 30/00* | (2011.01) |
| *H02J 7/34* | (2006.01) |

(52) U.S. Cl.
CPC ............ *H01G 11/08* (2013.01); *H01G 11/10* (2013.01); *H01G 11/14* (2013.01); *H01G 11/32* (2013.01); *H01G 11/58* (2013.01); *H01G 11/60* (2013.01); *H01G 11/62* (2013.01); *H01G 11/78* (2013.01); *H01M 10/39* (2013.01); *H01M 10/425* (2013.01); *H01M 10/4257* (2013.01); *H01M 10/44* (2013.01); *H01M 10/46* (2013.01); *H01M 10/48* (2013.01); *H01M 16/00* (2013.01); *H01M 50/10* (2021.01); *H02J 7/007* (2013.01); *H02J 7/0042* (2013.01); *H02J 7/0071* (2020.01); *H02J 7/0072* (2013.01); *B82Y 30/00* (2013.01); *H01G 11/36* (2013.01); *H01M 2010/4271* (2013.01); *H01M 2010/4278* (2013.01); *H01M 2220/10* (2013.01); *H02J 7/345* (2013.01); *Y02E 60/13* (2013.01); *Y10T 29/49108* (2015.01); *Y10T 29/49117* (2015.01)

(56) References Cited

U.S. PATENT DOCUMENTS

| | | |
|---|---|---|
| 4,408,259 A | 10/1983 | Muranaka et al. |
| 4,934,366 A | 6/1990 | Truex et al. |
| 5,440,447 A | 8/1995 | Shipman et al. |
| 5,441,827 A | 8/1995 | Gratzel et al. |
| 5,476,709 A | 12/1995 | Inoue et al. |
| 5,711,988 A | 1/1998 | Tsai et al. |
| 5,923,619 A | 7/1999 | Knapen et al. |
| 6,059,847 A | 5/2000 | Farahmandi et al. |
| 6,118,251 A | 9/2000 | Atwater |
| 6,193,779 B1 | 2/2001 | Reichert et al. |
| 6,205,016 B1 | 3/2001 | Niu |
| 6,232,706 B1 | 5/2001 | Dai et al. |
| 6,257,332 B1 | 7/2001 | Vidrine et al. |
| 6,304,427 B1 | 10/2001 | Reed et al. |
| 6,350,488 B1 | 2/2002 | Lee et al. |
| 6,388,423 B1 | 5/2002 | Schilleci, Jr. |
| 6,413,285 B1 | 7/2002 | Chu et al. |
| 6,444,326 B1 | 9/2002 | Smith |
| 6,454,816 B1 | 9/2002 | Lee et al. |
| 6,491,848 B1 | 12/2002 | Sato et al. |
| 6,511,760 B1 | 1/2003 | Barone et al. |
| 6,514,113 B1 | 2/2003 | Lee et al. |
| 6,565,701 B1 | 5/2003 | Jerabek et al. |
| 6,665,169 B2 | 12/2003 | Tennent et al. |
| 6,764,874 B1 | 7/2004 | Zhang et al. |
| 6,843,119 B2 | 1/2005 | Patey et al. |
| 6,872,681 B2 | 3/2005 | Niu et al. |
| 6,906,911 B2 | 6/2005 | Ikeda et al. |
| 6,914,341 B1 | 7/2005 | McIntyre |
| 6,924,059 B1 | 8/2005 | Kawakami et al. |
| 6,962,823 B2 | 11/2005 | Empedocles et al. |
| 7,070,833 B2 | 7/2006 | Smith et al. |
| 7,126,207 B2 | 10/2006 | Mosley et al. |
| 7,201,627 B2 | 4/2007 | Ohnuma |
| 7,327,556 B2 | 2/2008 | Ro et al. |
| 7,335,395 B2 | 2/2008 | Ward et al. |
| 7,381,367 B1 | 6/2008 | Baker et al. |
| 7,511,941 B1 | 3/2009 | Gallay et al. |
| 7,699,102 B2 | 4/2010 | Storm et al. |
| 7,785,558 B2 | 8/2010 | Hi Kata |
| 7,897,209 B2 | 3/2011 | Shibuya et al. |
| 7,982,439 B2 | 7/2011 | Trainor et al. |
| 7,999,695 B2 | 8/2011 | Rodney et al. |
| 8,025,971 B2 | 9/2011 | Maeno et al. |
| 8,168,331 B2 | 5/2012 | Best et al. |
| 8,531,818 B2 | 9/2013 | Hashimoto et al. |
| 8,760,851 B2 | 6/2014 | Signorelli et al. |
| 9,013,144 B2 | 4/2015 | Cooley et al. |
| 2001/0006108 A1 | 7/2001 | Brett |
| 2002/0043369 A1 | 4/2002 | Vinegar et al. |
| 2002/0159943 A1 | 10/2002 | Smalley et al. |
| 2002/0177018 A1 | 11/2002 | Fuglevand |
| 2003/0003359 A1 | 1/2003 | Banno et al. |
| 2003/0027038 A1 | 2/2003 | Tsukamoto et al. |
| 2003/0030969 A1 | 2/2003 | Farahmandi et al. |
| 2003/0081372 A1 | 5/2003 | Nakazawa et al. |
| 2004/0131937 A1 | 7/2004 | Chen et al. |
| 2004/0188350 A1 | 9/2004 | Beste et al. |
| 2004/0229117 A1 | 11/2004 | Mitani et al. |
| 2005/0152096 A1 | 7/2005 | Farahmandi et al. |
| 2005/0172721 A1 | 8/2005 | Daigle |
| 2005/0181941 A1 | 8/2005 | Sugo et al. |
| 2005/0182744 A1 | 8/2005 | Kawabata et al. |
| 2005/0208207 A1 | 9/2005 | Hinoki et al. |
| 2005/0230270 A1 | 10/2005 | Ren et al. |
| 2005/0231893 A1 | 10/2005 | Harvey |
| 2005/0234177 A1 | 10/2005 | Zaghib et al. |
| 2005/0238810 A1 | 10/2005 | Scaringe et al. |
| 2006/0019168 A1 | 1/2006 | Li et al. |
| 2006/0115722 A1 | 6/2006 | Kim |
| 2006/0191681 A1 | 8/2006 | Storm et al. |
| 2006/0191687 A1* | 8/2006 | Storm .................. E21B 47/017 |
| | | 166/302 |
| 2006/0194102 A1 | 8/2006 | Keshishian et al. |
| 2006/0256506 A1 | 11/2006 | Konuma et al. |
| 2006/0279906 A1 | 12/2006 | Stemen et al. |
| 2006/0288769 A1* | 12/2006 | Odom .................. G01V 8/02 |
| | | 73/152.22 |
| 2007/0015336 A1 | 1/2007 | Farahmandi et al. |
| 2007/0076349 A1 | 4/2007 | Dementiev et al. |
| 2007/0097598 A1 | 5/2007 | Siggel et al. |
| 2007/0146965 A1 | 6/2007 | Mitchell et al. |
| 2007/0188977 A1 | 8/2007 | Takeda et al. |
| 2007/0254213 A1 | 11/2007 | Best et al. |
| 2007/0258192 A1 | 11/2007 | Schindall et al. |

(56) References Cited

U.S. PATENT DOCUMENTS

| | | | |
|---|---|---|---|
| 2007/0258193 | A1 | 11/2007 | Zhong et al. |
| 2007/0259216 | A1 | 11/2007 | Logan |
| 2007/0292746 | A1 | 12/2007 | Sloop |
| 2008/0013224 | A1 | 1/2008 | Kim et al. |
| 2008/0066979 | A1 | 3/2008 | Carter |
| 2008/0068801 | A1 | 3/2008 | Wilk |
| 2008/0083626 | A1 | 4/2008 | Kubo et al. |
| 2008/0090183 | A1 | 4/2008 | Zhu et al. |
| 2008/0094777 | A1 | 4/2008 | Itahashi et al. |
| 2008/0123330 | A1 | 5/2008 | Sullivan |
| 2008/0164062 | A1 | 7/2008 | Brackin et al. |
| 2008/0192407 | A1 | 8/2008 | Lu et al. |
| 2008/0316678 | A1 | 12/2008 | Ehrenberg et al. |
| 2009/0011330 | A1 | 1/2009 | Onodera et al. |
| 2009/0021890 | A1 | 1/2009 | Bourcier et al. |
| 2009/0102478 | A1 | 4/2009 | Reiderman et al. |
| 2009/0122468 | A1 | 5/2009 | Miura et al. |
| 2009/0250409 | A1 | 10/2009 | Fiene et al. |
| 2009/0272935 | A1 | 11/2009 | Hata et al. |
| 2009/0272946 | A1 | 11/2009 | Lu |
| 2009/0294753 | A1 | 12/2009 | Hauge et al. |
| 2009/0302153 | A1 | 12/2009 | Matasso et al. |
| 2009/0303658 | A1 | 12/2009 | Hiroyuki et al. |
| 2010/0016287 | A1 | 1/2010 | Bonanomi et al. |
| 2010/0046142 | A1 | 2/2010 | Aitchison et al. |
| 2010/0119934 | A1 | 5/2010 | Ushio et al. |
| 2010/0134955 | A1 | 6/2010 | O'Connor et al. |
| 2010/0196600 | A1 | 8/2010 | Shibuya et al. |
| 2011/0080689 | A1 | 4/2011 | Bielawski et al. |
| 2011/0085285 | A1 | 4/2011 | Zednicek et al. |
| 2011/0141661 | A1 | 6/2011 | Muthu et al. |
| 2011/0150736 | A1 | 6/2011 | Hagiwara et al. |
| 2011/0151317 | A1 | 6/2011 | Giroud et al. |
| 2011/0170236 | A1 | 7/2011 | Young |
| 2012/0154979 | A1 | 6/2012 | Signorelli et al. |
| 2012/0268074 | A1 | 10/2012 | Cooley et al. |
| 2012/0313586 | A1 | 12/2012 | Signorelli et al. |
| 2013/0029215 | A1 | 1/2013 | Signorelli et al. |
| 2013/0044405 | A1 | 2/2013 | Brambilla et al. |
| 2013/0045157 | A1 | 2/2013 | Brambilla et al. |
| 2013/0141840 | A1 | 6/2013 | Cooley et al. |
| 2014/0042988 | A1 | 2/2014 | Kuttipillai |
| 2014/0057164 | A1 | 2/2014 | Brambilla et al. |
| 2014/0265565 | A1 | 9/2014 | Cooley et al. |
| 2014/0265580 | A1 | 9/2014 | Cooley et al. |
| 2015/0218913 | A1 | 8/2015 | Cooley et al. |

FOREIGN PATENT DOCUMENTS

| | | |
|---|---|---|
| CN | 101600851 A | 12/2009 |
| JP | H05234814 A | 9/1993 |
| JP | 2000100672 A | 4/2000 |
| JP | 2003045759 A | 2/2003 |
| JP | 2003133185 A | 5/2003 |
| JP | 2003173936 A | 6/2003 |
| JP | 2004127774 A | 4/2004 |
| JP | 2008088135 A | 4/2008 |
| JP | 2008258220 A | 10/2008 |
| JP | 2010283309 A | 12/2010 |
| WO | 9407272 A1 | 3/1994 |
| WO | 9966985 A1 | 12/1999 |
| WO | 2007101303 A1 | 9/2007 |
| WO | 2008016990 A2 | 2/2008 |
| WO | 2008085946 A2 | 7/2008 |
| WO | 2009137508 A1 | 11/2009 |

OTHER PUBLICATIONS

Awad, et al., "Thermal degradation studies of alkyl-imidazolium salts and their application in nanocomposites," Thermochimica Acta, pp. 3-11, 2004, vol. 409.

Balducci, et al., "High temperature carbon-carbon supercapacitor using ionic liquid as electrolyte," J. Power Sources, pp. 922-927, Jan. 3, 2007, vol. 165.

Emmenegger, et al., "Investigation of Electrochemical Double-layer {ECOL) Capacitors Electrodes Based on Carbon Nanotubes and Activated Carbon Materials," J. of Power Sources, 2003, pp. 321-329, vol. 124.

Extended European Search Report from EP 12790090.0, dated Jun. 25, 2015.

Halber, "Researchers Fired Up Over New Battery", The Tech, Feb. 8, 2006, pp. 1, 5, vol. 50, No. 16.

Hensley, et al., "The evolution of oilfield batteries", Oilfield Review, Autumn 1998, pp. 42-57.

Hyeok, et al., "Electrochemical Properties of High-Power Supercapacitors Using Single-Walled Carbon Nanotube Electrodes," Adv. Funct. Mater., Oct. 2001, 387-392, vol. 11, No. 5.

International Search Report from PCT/US2007/068314, dated Feb. 13, 2008.

International Search Report from PCT/US2012/039342, dated Dec. 6, 2012.

International Search Report from PCT/US2012/041438, dated Nov. 19, 2012.

International Search Report from PCT/US2012/045994, dated Jan. 25, 2013.

International Search Report from PCT/US2012/047474, dated Jan. 31, 2013.

International Search Report from PCT/US2013/027697, dated Jun. 26, 2013.

International Search Report from PCT/US2014/02992, dated Oct. 7, 2014.

International Search Report from PCT/US2014/030310, dated Oct. 10, 2014.

International search Report of the International Searching Authority from PCT/US2012/027697, dated Mar. 21, 2013.

Koch, "Electrochemical Double Layer Capacitors for High Temperature Applications," 14th International Seminar on Double Layer Capacitors and Hybrid Energy Storage Devices, Dec. 6-8, 2004, pp. 33-39.

Koch, "Thermally Robust Capacitors for the Drilling Industry," Report for U.S. Dept. of Energy Grant No. DE-FG02-06ER84598 for the period Jun. 28, 2006 to Mar. 27, 2007.

Liu, et al., "Graphene-Based Supercapacitor with an Ultrahigh Energy Density," Nano Lett., pp. 4863-4868, 2010, vol. 10.

Marincic, "High Temperature Electrochemical Double Layer Capacitors with Reduced Leakage Rate," 14th International Seminar on Double Layer Capacitors and Hybrid Energy Storage Devices, Dec. 6-8, 2004,pp. 310-316.

Maxwell Technologies Application Note, "Maxwell Technologies' Test Procedures for Capacitance, ESR, Leakage Current and Self-Discharge Characterizations of Ultracapacitors," Jul. 2009,pp. 1-10.

Murakami, et al., "Growth of Vertically Aligned Single-walled Carbon Nanotube Films on Quartz Substrates and Their Optical Anisotropy," Chem. Phys. Lett., 2004, pp. 298-303, vol. 385.

Ngo, et al., "Thermal properties of imidazolium ionic liquids," Thermochimica Acta, pp. 97-102, 2000, vol. 357-58.

Nishida, et al., "Physical and electrochemical properties of 1-alkyl-3-nriethylirnidazolium tetrafluoroborate for electrolyte," J. Fluorine Chem., pp. 135-141, 2003, vol. 120.

Niu, et al., "High Power Electrochemical Capacitors Based on Carbon Nanotube Electrodes," Appl. Phys. Lett., Mar. 17, 1997, pp. 1480-1482, vol. 70, No. 11.

Notice of Allowance dated May 1, 2014, U.S. Appl. No. 12/928,896.
Office Action dated Dec. 11, 2013, U.S. Appl. No. 12/928,897.
Office Action dated Jul. 16, 2014, U.S. Appl. No. 12/928,897.
Office Action dated Jun. 18, 2014, U.S. Appl. No. 13/588,452.
Office Action dated May 29, 2014, U.S. Appl. No. 13/560,628.
Office Action dated Oct. 15, 2014, U.S. Appl. No. 13/587,037.

Randstrom, "The influence of air and its components on the cathodic stability of N-butyl-N-methylpyrrolidinium bis(trifluoromethanesulfonyl)imide," Electrochimica Acta, pp. 1837-1842, Aug. 19, 2007, vol. 53.

Robertson, "Realistic applications of CNTs," materialstoday, Oct. 2004, pp. 46-52, vol. 7, No. 10.

(56) References Cited

OTHER PUBLICATIONS

Signorelli, et al., "Carbon Nanotube Enhanced Ultracapacitor", MIT Lab. for Electromagnetic and Electronic Systems; Sep. 2004, 2 pages.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003,pp. A499-A502, vol. 150, No. 4.
Written Opinion of the International Searching Authority from PCT/US2007/068314, dated Feb. 13, 2008.
Written Opinion of the International Searching Authority from PCT/US2012/027697, dated Mar. 25, 2011.
Written Opinion of the International Searching Authority from PCT/US2012/039342, dated Dec. 6, 2012.
Written Opinion of the International Searching Authority from PCT/US2012/041438, dated Nov. 19, 2012.
Written Opinion of the International Searching Authority from PCT/US2012/045994, dated Dec. 26, 2012.
Written Opinion of the International Searching Authority from PCT/US2012/047474, dated Jan. 27, 2014.
Written Opinion of the International Searching Authority from PCT/US2013/027697, dated Jun. 26, 2013.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005,pp. 101-110.
Schneuwly, et al. "Properties of supercapacitors From the state-of-the-ar to future trends" Proc. PCIM 2000.
Shamsipur et al.,"Physical&electrochemical prop.of ionic liquidsl-ethyl-3-methyl. tetrafluoroborate,1-butyl-3-methyl. trifluoromethanesulfonate &1-butyl-1-methylpyrrolidinium bis (trifluoromethylsulfonyl)imide," j. Mol. Liq.,pp. 43-50, Aug. 24,2010,vol. 157.
Wongwiriyapan, et al., "Direct Grotwh of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Extended European Search Report for EP Application No. 20174829.0; Report dated Nov. 30, 2020 (8 pages).

\* cited by examiner

Power Converter - 81

Power Converter - 81

Power Converter - 81

Bypass controller - 190

Bypass controller - 190

Bypass controller - 190

POWER SYSTEM FOR HIGH TEMPERATURE APPLICATIONS WITH RECHARGEABLE ENERGY STORAGE

CROSS REFERENCE TO RELATED APPLICATIONS

This application is a continuation of U.S. patent application Ser. No. 15/918,908, filed Mar. 12, 2018, which is a continuation of U.S. patent application Ser. No. 14/792,726, filed Jul. 7, 2015, now U.S. Pat. No. 9,954,382, granted Apr. 24, 2018, which is a continuation of U.S. patent application Ser. No. 14/683,475, filed Apr. 10, 2015, Aug. 3, 2015, which is a continuation of U.S. patent application Ser. No. 13/480,085, filed May 24, 2012, now U.S. Pat. No. 9,013,144, granted Apr. 21, 2015, which is a continuation-in-part of U.S. patent application Ser. No. 12/928,896, filed Dec. 21, 2010, now U.S. Pat. No. 8,760,851, granted Jun. 24, 2014, the entire disclosures of which are incorporated by reference herein in their entireties. U.S. patent application Ser. No. 13/480,085 also claims the benefit of U.S. Provisional Patent Application Nos. 61/489,389 filed May 24, 2011; 61/493,039 filed Jun. 3, 2011; 61/494,332 filed Jun. 7, 2011; 61/537,360 filed Sep. 21, 2011; and 61/620,364 filed Apr. 4, 2012, the entire disclosures of which are incorporated by reference herein in their entirety.

BACKGROUND OF THE INVENTION

1. Field of the Invention

This invention relates to methods and apparatus for providing power in a high temperature environment, in particular, for instrumentation and tooling used in subsurface environments generally in the exploration for hydrocarbons.

2. Description of the Related Art

As mankind continues to search for and extract oil, the quest for hydrocarbons has grown increasingly complex. This complexity has given rise to all sorts of complicated instrumentation. Consistent with other segments of technology, increasing complexity of instrumentation presents users with increasing power demands.

Unfortunately, the downhole environment presents real and unavoidable problems for system owners and operators. For example, and of no small consequence, are problems that arise with downhole temperatures. That is, as well drilling and logging plunges ever deeper into the Earth's crust, the exposure of downhole tooling to high temperature environments continues to increase.

The increased temperature can often present technical limitations when conventional power supplies fail. For example, when chemically based battery storage is essentially degraded to the point of losing functionality.

Thus, what is needed is a power system for supplying power in high temperature environments. Preferably, the power system includes rechargeable energy storage that provides users with power where conventional devices will fail to provide useful power. Further, it is preferred that the energy storage device be economic to use, handle and disposition.

BRIEF SUMMARY OF INVENTION

In one embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage, wherein the energy storage is configured to store between about one one hundredth (0.01) of a joule and about one hundred megajoules of energy, and to provide peak power of between about one one hundredth (0.01) of a watt and about one hundred megawatts, for at least two charge-discharge cycles.

In another embodiment, a method for providing power to a logging instrument downhole is provided. The method includes selecting a logging instrument that includes a power system including a rechargeable energy storage that is operable in a temperature range of between about minus forty degrees Celsius and two hundred and ten degrees Celsius coupled to a circuit for at least one of supplying power from the energy storage and charging the energy storage; and with the logging instrument downhole, providing power from the power system to the logging instrument.

In another embodiment, a method for fabricating a power system for a logging instrument is provided. The method includes selecting a rechargeable energy storage that is operable in a temperature range of between about minus forty degrees Celsius and two hundred and ten degrees Celsius coupled to a circuit for at least one of supplying power from the energy storage and charging the energy storage; and configuring the energy storage for incorporation into the logging instrument.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for depassivation of a battery in the energy storage.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for simulating electrical output of an energy supply.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for monitoring a state of charge of the energy storage.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for switching among at least two sources of energy.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for automatically adjusting a voltage output of the power system.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for switching between modes of operation.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for adjusting operation according to an environmental factor.

In another embodiment, a power system adapted for supplying power in a high temperature environment is provided. The power system includes a rechargeable energy storage that is operable in a temperature range of between about minus forty evenly degrees Celsius and two hundred and ten degrees Celsius coupled to a circuit for at least one of supplying power from the energy storage and charging the energy storage; wherein the circuit includes a subsystem for inducing low-power operation.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for logging data.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for managing performance of the power supply.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for monitoring health of the power system.

In another embodiment, a power system adapted for supplying power in a high temperature environment is provided. The power system includes a rechargeable energy storage that is operable in a temperature range of between about minus forty degrees Celsius and two hundred and ten degrees Celsius coupled to a circuit for at least one of supplying power from the energy storage and charging the energy storage; wherein the circuit includes a subsystem for accessing redundant elements.

In another embodiment, a method using a power supply is provided. The method includes selecting a power supply that has at least one ultracapacitor; and operating the power supply within a temperature range of between about minus forty degrees Celsius and about two hundred and ten degrees Celsius while maintaining a voltage of between about 0.1 Volts to about 4 Volts on the ultracapacitor for at least one hour; wherein, at the end of the hour, the ultracapacitor exhibits a leakage current less than 1,000 mAmp per liter of volume over the range of operating temperature.

In yet another embodiment, a method of using a power system is provided. The method includes coupling a rechargeable energy storage configured for high temperature operation with electronics configured for high temperature operation; and operating the power system by withdrawing pulses of power from an output of the power system, wherein each pulses comprises a peak value of at least 0.01 W and a total power-time product (energy) of at least 0.01 J.

BRIEF DESCRIPTION OF DRAWINGS

The features and advantages of the invention are apparent from the following description taken in conjunction with the accompanying drawings in which.

DETAILED DESCRIPTION OF THE INVENTION

Disclosed herein is a power system that provides electrical energy in a high temperature environment. In addition to providing electrical energy in a high temperature environment, the power system may be configured to provide users with a variety of additional functions. While embodiments of the power system presented herein are configured for use in a downhole (i.e., subterranean) environment, it should be recognized that the power system may be used equally well in high temperature environments that present challenges to provision of reliable power. Such challenges may include environmentally harsh conditions, limited space available for containing energy storage, a substantially remote location where it is difficult to communicate with external power supplies and the like. Prior to introducing the power system in greater detail, some context is provided.

Figure 1:
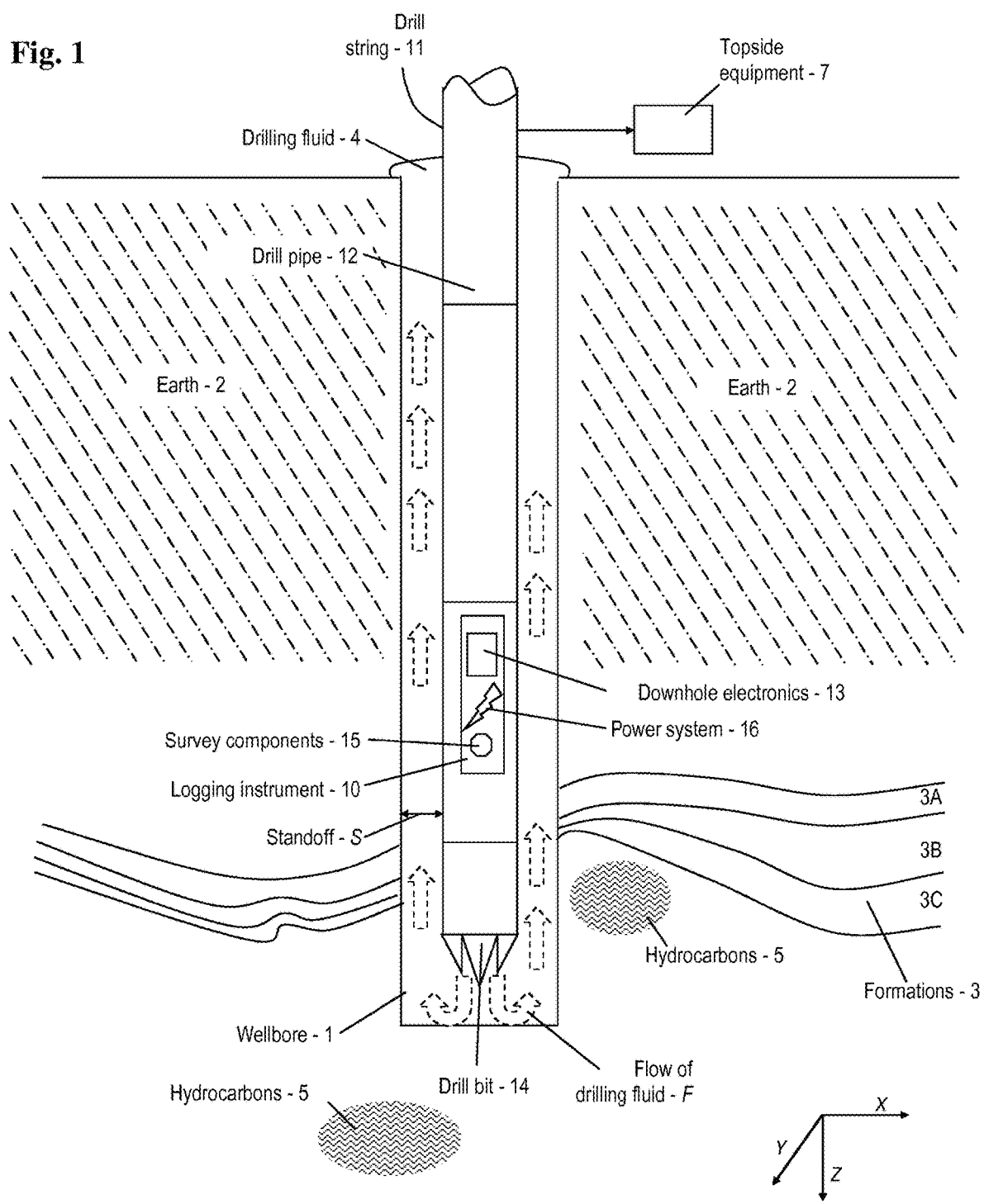
FIG. 1 illustrates an exemplary embodiment of a drill string that includes a logging instrument.

Refer now to FIG. 1 where aspects of an apparatus for drilling a wellbore 1 (also referred to as a "borehole") are shown. As a matter of convention, a depth of the wellbore 1 is described along a Z-axis, while a cross-section is provided on a plane described by an X-axis and a Y-axis.

In this example, the wellbore 1 is drilled into the Earth 2 using a drill string 11 driven by a drilling rig (not shown) which, among other things, provides rotational energy and downward force. The wellbore 1 generally traverses sub-surface materials, which may include various formations 3 (shown as formations 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as solids, fluids, gases, liquids, and the like.

In this example, the drill string 11 includes lengths of drill pipe 12 which drive a drill bit 14. The drill bit 14 also provides a flow of a drilling fluid 4, such as drilling mud. The drilling fluid 4 is often pumped to the drill bit 14 through the drill pipe 12, where the fluid exits into the wellbore 1. This results in an upward flow, F, of drilling fluid 4 within the wellbore 1. The upward flow generally cools the drill string 11 and components thereof, carries away cuttings from the drill bit 14 and prevents blowout of pressurized hydrocarbons 5.

The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 generally includes equipment for performing "measuring while drilling" (MWD), also referred to as "logging while drilling" (LWD). Performing MWD or LWD generally calls for operation of a logging instrument 10 that is incorporated into the drill string 11 and designed for operation while drilling. Generally, the logging instrument 10 for performing MWD is coupled to an electronics package which is also on board the drill string 11, and therefore referred to as "downhole electronics 13." Generally, the downhole electronics 13 provide for at least one of data collection, data analysis, and operational control such as electromechanical actuation(s), communications, power processing and the like. A power system 16 may be included. Generally, the power system 16 powers at least one of the logging instrument 10, survey components 15 and the downhole electronics 13. Often, the logging instrument 10 and the downhole electronics 13 are coupled to topside equipment 7. The topside equipment 7 may be included to further control operations, provide greater analysis capabilities as well as data logging and the like. A communications channel (discussed below) may provide for communications to the topside equipment 7, and may operate via pulsed mud, wired pipe, EM telemetry, fiber optic and other technologies as are known in the art and are practicable for a given application.

Figure 2:
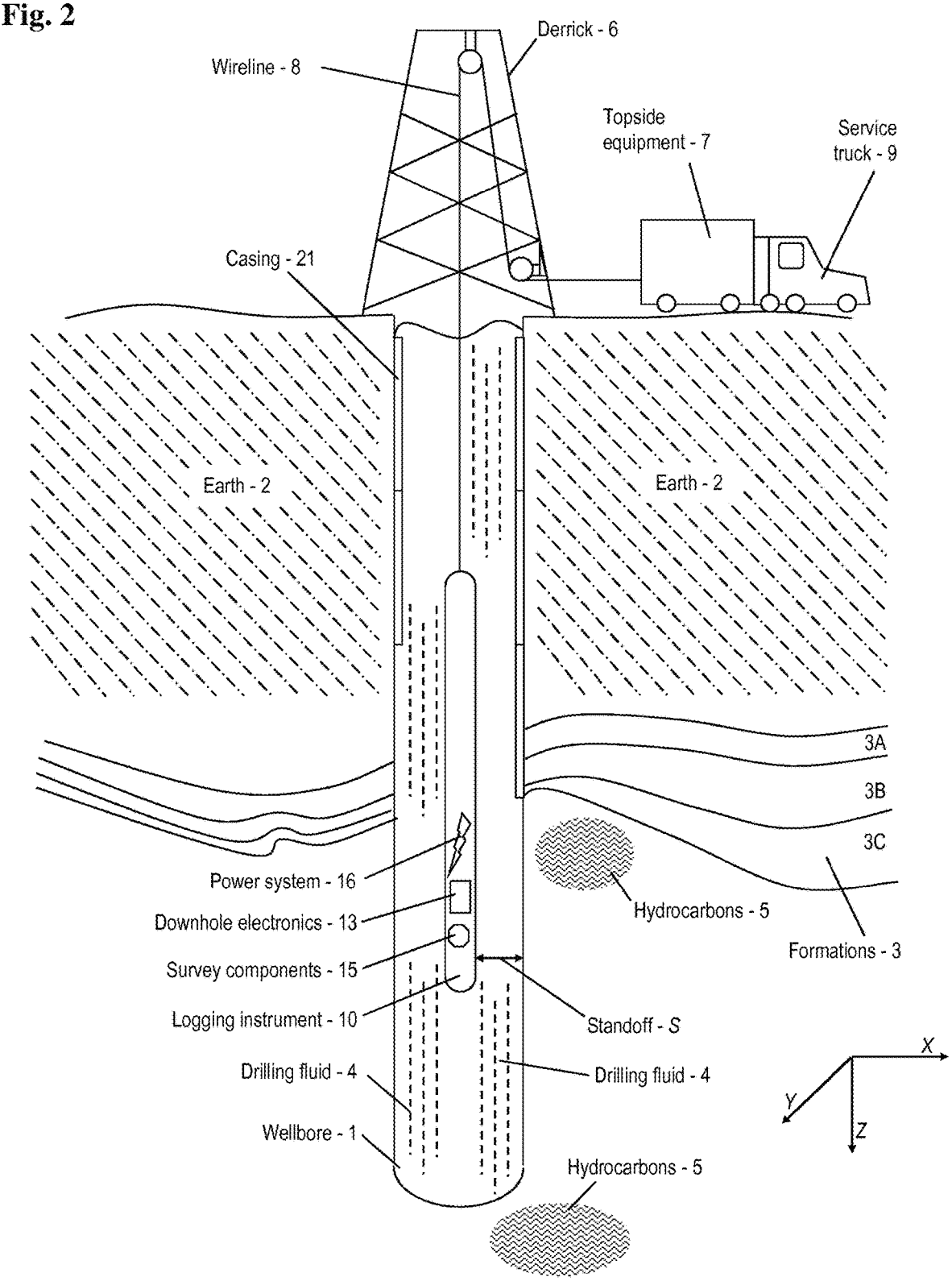
FIG. 2 illustrates an exemplary embodiment for well logging with an embodiment of the logging instrument deployed by a wireline.

Referring now to FIG. 2, an exemplary logging instrument 10 for wireline logging of the wellbore 1 is shown. As a matter of convention, a depth of the wellbore 1 is described along a Z-axis, while a cross-section is provided on a plane described by an X-axis and a Y-axis. Prior to well logging with the logging instrument 10, the wellbore 1 is drilled into the Earth 2 using a drilling apparatus, such as the one shown in FIG. 1.

In some embodiments, the wellbore 1 has been filled, at least to some extent, with drilling fluid 4. The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from logging operations during wireline logging. Generally, a layer of materials will exist between an outer surface of the logging instrument 10 and a wall of the wellbore 1. This layer is referred to as a "standoff layer," and includes a thickness, referred to as "standoff, S."

A casing 21 may be inserted into the wellbore 1 to ensure physical integrity. The casing may be formed in the wellbore 1, inserted therein, or otherwise disposed in the wellbore 1. The casing 21 may be segmented or continuous. For purposes of discussion herein, the casing 21 generally includes various installations of cementatious outer casing 21, as well as inner production tubing (such as production tubing).

Generally, in wireline logging, the logging instrument 10 is lowered into the wellbore 1 using a wireline 8 deployed by a derrick 6 or similar equipment. Generally, the wireline 8 includes suspension apparatus, such as a load bearing cable, as well as other apparatus. The other apparatus may include a power system, a communications link (such as wired or optical) and other such equipment. Generally, the wireline 8 is conveyed from a service truck 9 or other similar apparatus (such as a service station, a base station, etc, . . . ). Often, the wireline 8 is coupled to topside equipment 7. The topside equipment 7 may provide power to the logging instrument 10, as well as provide computing and processing capabilities for at least one of control of operations and analysis of data.

Generally, the logging instrument 10 includes apparatus for performing measurements "downhole" or in the wellbore 1. Such apparatus include, for example, a variety of survey components 15. Exemplary survey components 15 may include radiation detectors, shielding, sensors, transducers, and many of the other various survey components 15 known in the art. The components 15 may communicate with downhole electronics 13 as appropriate. The power system 16 may be included. Generally, the power system 16 powers at least one of the logging instrument 10, survey components 15 and downhole electronics 13. The measurements and other sequences as may be performed using the logging instrument 10 are generally performed to ascertain and qualify presence of hydrocarbons 5, but may be used for other purposes, such as to identify geothermal resources.

Figure 3:
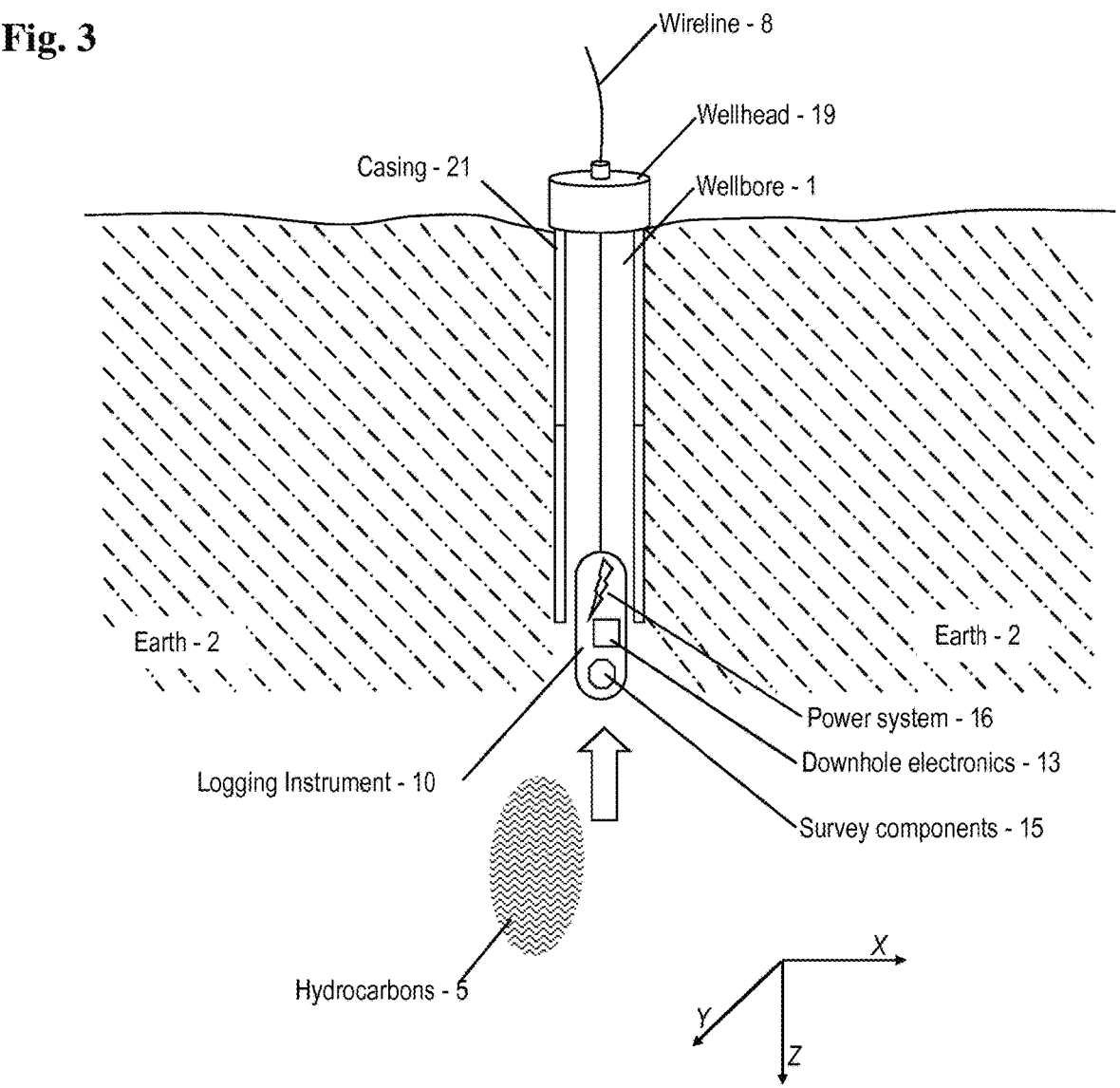
FIG. 3 illustrates an exemplary embodiment of a producing well with an embodiment of the logging instrument deployed therein.

Referring now to FIG. 3, there is shown an exemplary logging instrument 10 for logging during production. The production logging instrument 10 may be deposited within the wellbore 1, where it will reside during extraction of hydrocarbons 5. The production logging instrument 10 may be deposited downhole by use of other equipment, such as a tractor (not shown). In some embodiments, the production logging instrument 10 may include elements of a tractor (such as a motor and track). The power system 16 may be included. Generally, the power system 16 powers at least one of the logging instrument 10, survey components 15 and downhole electronics 13.

Once production is initiated, the drilling fluid 4 is expelled from the wellbore 1. A flow of the hydrocarbons 5 is established. During initiation of production, a wellhead 19 is placed over the wellbore 1. The wellhead 19 provides for regulation of flow from the wellbore 1, and accommodates extended periods of extraction of the hydrocarbons 5. As shown by the upward arrow, when the production logging instrument 10 is in place, production (the withdrawal of hydrocarbons 5) may continue unabated. Generally, the wellhead 19 includes a blow-out preventer, as is known in the art.

Consider now to the power system 16 in more detail. In exemplary embodiments, the power system 16 includes internal energy storage. The energy storage may include any one or more of a variety of forms of rechargeable energy storage. For example, rechargeable energy storage may include at least one type of battery, an ultracapacitor and other similar devices. Aspects of exemplary energy storage are now discussed in greater detail.

Note that the power system 16 may generally be any device that can accept and supply power reliably at high temperature. Other exemplary forms of energy storage 30 include chemical batteries, for instance aluminum electrolytic capacitors, tantalum capacitors, ceramic and metal film capacitors, hybrid capacitors magnetic energy storage, for instance, air core or high temperature core material inductors. Other types of that may also be suitable include, for instance, mechanical energy storage devices, such as fly wheels, spring systems, spring-mass systems, mass systems, thermal capacity systems (for instance those based on high thermal capacity liquids or solids or phase change materials), hydraulic or pneumatic systems. One example is the high temperature hybrid capacitor available from Evans Capacitor Company Providence, R.I. USA part number HC2D060122 DSCC10004-16 rated for 125 degrees Celsius. Another example is the high temperature tantalum capacitor available from Evans Capacitor Company Providence, R.I. USA part number HC2D050152HT rated to 200 degrees Celsius. Yet another example is an aluminum electrolytic capacitor available from EPCOS Munich, Germany part number B41691A8107Q7, which is rated to 150 degrees Celsius. Yet another example is the inductor available from Panasonic Tokyo, Japan part number ETQ-P5M470YFM rated for 150 degrees Celsius. Additional embodiments are available from Saft, Bagnolet, France (part number Li-ion VL 32600-125) operating up to 125 degrees Celsius with 30 charge-discharge cycles, as well as a li-ion battery (experimental) operable up to about 250 degrees Celsius, and in experimental phase with Sadoway, Hu, of Solid Energy in Cambridge, Mass.

The environment downhole is harsh and therefore presents considerable challenges to reliability of equipment. For example, ambient temperatures may range from those at the surface up to about 300 degrees Celsius and higher. As will be discussed further herein, in some embodiments, the power system 16 disclosed is configured to operate in environments where the ambient temperatures are in the range of about seventy (70) degrees Celsius up to about 200 degrees Celsius, and, in some embodiments, higher (for example, up to about 250 degrees Celsius). In some embodiments, the power system 16 may be operated in environments where the ambient temperatures is as low as about minus forty (−40) degrees Celsius. However, it should be noted that the power system 16 may operate in a wider temperature range, and therefore this temperature range is not limiting of the teachings herein.

As a matter of convention, and for purposes of the teachings herein, the term "energy storage" refers to an energy storage device that will operate in environments where increased temperature will cause a conventional energy storage device generally to fail. That is, the energy storage will outperform the conventional energy storage device when placed in an equivalent environment and provide at least some degree of utility as a function of increasing temperature.

In general, ultracapacitors as provided and used according to the teachings herein provide numerous advantages over existing energy storage technology. These advantages result in an ability to provide and use power at higher temperatures than previously achieved. Accordingly, as users of downhole tooling are provided with greater operating range, areas that were previously out of reach as a result of power limitations become accessible.

One set of advantages originates in the rechargeable nature of an ultracapacitor. An ultracapacitor can both release and accept energy. An ultracapacitor may be used as a rechargeable energy storage device for downhole applications. For example, an ultracapacitor may provide power to the tool in a pulsed or intermittent fashion, but be recharged by a wireline, downhole battery, or downhole generator in a more continuous fashion.

Another set of advantages originates in the high power handling capability of ultracapacitors. An ultracapacitor is well known to exhibit less internal resistance for similar volumes and weights when compared to chemical battery energy storage technologies. This characteristic enables higher power delivery capability when compared to primary (non-rechargeable) chemical battery technologies and further higher power recovery capability when compared to rechargeable chemical battery technologies. The ultracapacitor may be used to extend the power handling capability of an overall system. For example, an ultracapacitor may provide large pulses of power not available directly from typical wireline, downhole battery, or downhole generator power delivery systems.

Another set of advantages originates in the materials used to produce an ultracapacitor. Because an ultracapacitor stores energy in electric fields rather than via chemical reactions, the materials themselves are less prone to catastrophic failures either by exposing those materials to air environments or by using the energy storage device beyond is rated capability. For example, an ultracapacitor may be used with little or no augmentation of handling, safety and disposal logistics beyond the procedures already in place to support downhole applications. Additionally, the use of an ultracapacitor in downhole applications may reduce the need for other energy storage technology and in this case would actually reduce the needed handling, safety and disposal logistics required to support downhole applications.

Another set of advantages originates in the high energy density of ultracapacitors. An ultracapacitor can store about 50 to about 1,000 times more energy than capacitors of comparable size and volume. This feature enables the ultracapacitor to provide high power for a longer duration in downhole tools.

Ultracapacitors have never been suitable, before now, for uses in downhole tools due to their inability to operate at temperatures greater than about seventy degrees Celsius. Embodiments of exemplary ultracapacitors suited for the teachings herein solve problems associated with high temperature operation by being capable of reliable and safe operation in the harsh environments often encountered downhole.

More detail on exemplary embodiments of an ultracapacitor are now provided.

Figure 4:
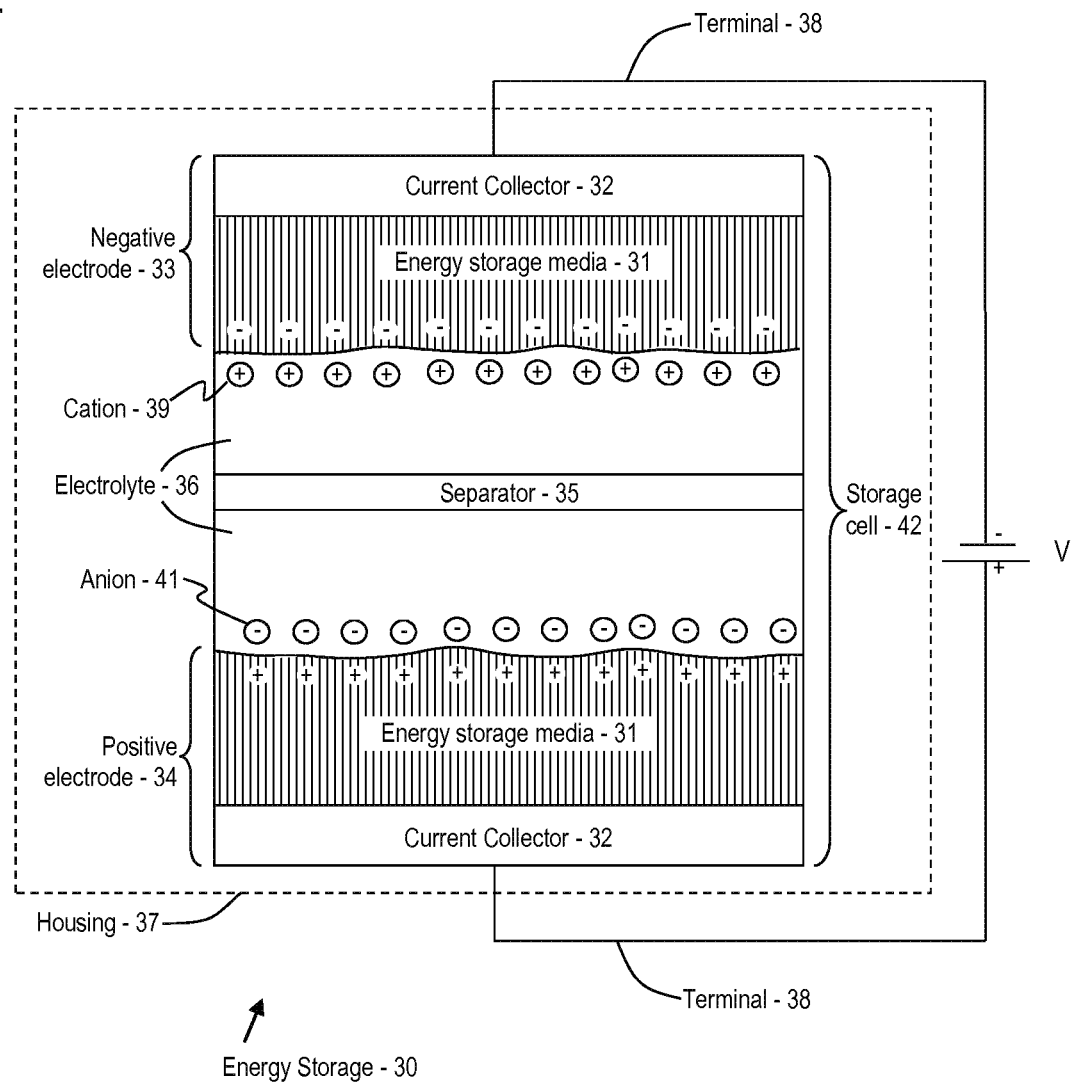
FIG. 4 is a schematic view of aspects of an exemplary rechargeable energy storage that includes a single storage cell, the cell being an electrolytic double layer capacitor, EDLC, and suited for use as a high temperature energy storage.

As shown in FIG. 4, an exemplary energy storage 30 includes at least one storage cell 42. In this example, the energy storage 30 includes an electrochemical double-layer capacitor (EDLC), also referred to as an "ultracapacitor." The ultracapacitor includes two electrodes (referred to, by convention, as a "negative electrode" 33 and a "positive electrode" 34, however, the ultracapacitor need not have a charge stored therein for purposes of this description), each electrode 33, 34 having a double layer of charge at an electrolyte interface. In some embodiments, a plurality of electrodes is included. However, for purposes of discussion, only two electrodes 33, 34 are shown. As a matter of convention herein, each of the electrodes 33, 34 use a carbon-based energy storage media 31 (as discussed further herein) to provide energy storage.

Each of the electrodes 33, 34 includes a respective current collector 32. The electrodes 33, 34 are separated by a separator 35. In general, the separator 35 is a thin structural material (usually a sheet) used to separate the electrodes 33, 34, into two or more compartments.

At least one form of electrolyte 36 is included. The electrolyte 36 fills void spaces in and between the electrodes 33, 34 and the separator 35. In general, the electrolyte 36 is a substance that includes electrically charged ions. A solvent that dissolves the substance may be included in some embodiments. A resulting electrolytic solution conducts electricity by ionic transport.

As a matter of convenience, a combination of the electrodes 33, 34, the separator 35 and the electrolyte 36 are referred to as a "storage cell 42." In some embodiments, the term "storage cell" merely makes reference to the electrodes 33, 34 and the separator 35 without the electrolyte 36.

Generally, the exemplary EDLC is of a wound form which is then packaged into a cylindrical enclosing housing 37 (which may be referred to simply as the "housing 37"). Other forms, such as prismatic forms, may be used. The housing 37 may be hermetically sealed. In various examples, the package is hermetically sealed by techniques making use of laser, ultrasonic, and/or welding technologies. The housing 37 (also referred to as a "case") includes at least one terminal 38. Each terminal 38 provides electrical access to energy stored in the energy storage media 31.

In some embodiments, the housing 37 is fabricated from at least one material that is selected to minimize reactivity with the electrolyte 36. For example, the housing 37 may be fabricated from aluminum as well as an alloy of aluminum. In some embodiments, other materials such as tantalum may be used, at least in part (for example, as a terminal 38).

In the exemplary EDLC, the energy storage media 31 may be provided by and include activated carbon, carbon fibers, rayon, graphene, aerogel, carbon cloth, carbon nanotubes (such as single-walled and/or multi-walled) and/or other carbon nanoforms. Activated carbon electrodes may be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body.

Carbon fiber electrodes may be produced, for example, by using paper or cloth pre-form with high surface area carbon fibers.

In one specific example, multiwall carbon nanotubes (MWNT) are fabricated on any one of a variety of substrates by using chemical vapor deposition (CVD). The MWNT so fabricated are then useful in the electrodes 33, 34. In one embodiment, low-pressure chemical vapor deposition (LPCVD) is used. The fabrication process may use a gas mixture of acetylene, argon, and hydrogen, and an iron catalyst deposited on the substrate using electron beam deposition and or sputtering deposition.

In some embodiments, material used to form the energy storage media 31 may include material other than pure carbon. For example, various formulations of materials for providing a binder may be included. In general, however, the energy storage media 31 is substantially formed of carbon, and is therefore referred to as a "carbonaceous material."

In short, although formed predominantly of carbon, the energy storage media 31 may include any form of carbon, and any additives or impurities as deemed appropriate or acceptable, to provide for desired functionality as the energy storage media 31.

The electrolyte 36 includes a pairing of a plurality of cations 39 and anions 41, and, in some embodiments, may include the solvent. Various combinations of each may be used. In the exemplary EDLC, the cation 39 may include 1-(3-cyanopropyl)-3-methylimidazolium, 1,2-dimethyl-3-propylimidazolium, 1,3-bis(3-cyanopropypimidazolium, 1,3-diethoxyimidazolium, 1-butyl-1-methylpiperidinium, 1-butyl-2,3-dimethylimidazolium, 1-butyl-3-methylpyrolidinium, 1-butyl-4-methylpyridinium, 1-butylpyridinium, 1-decyl-3-methylimidazolium, 1-ethyl-3-methylimidazolium, 3-methyl-1-propylpyridinium, and combinations thereof as well as other equivalents as deemed appropriate.

In the exemplary EDLC, the anion 41 may include bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof or other material(s) that exhibit appropriate performance characteristics.

Once the EDLC is fabricated, it may be used in high temperature applications with little or no leakage current. The EDLC described herein can operate efficiently over a wide temperature range, with leakage currents normalized over the volume of the device less than 1 amp per liter (A/L) of volume of the device within the entire operating voltage and temperature range. One key to this performance is the assembly process itself, which produces a finished EDLC having a moisture concentration in the electrolyte of less than 500 parts per million (ppm) over the weight and volume of the electrolyte and an amount of impurities less than 1,000 ppm.

In some embodiments, more specifically, the carbonaceous media making up each of the electrodes 33, 34 is dried at elevated temperature in a vacuum environment. The separator 35 is dried at elevated temperature in a vacuum environment. The electrolyte 36 is dried at elevated temperature in a vacuum environment. Once the electrodes 33, 34 the separator 35, and electrolyte 36 are dried under vacuum, they are packaged without a final seal or cap in an atmosphere with less than 50 parts per million (ppm) of water. The uncapped EDLC is dried under vacuum over an elevated temperature range. Once this final drying is complete, the EDLC is sealed in an atmosphere with less than 50 ppm of moisture.

In addition, impurities in the electrolyte 36 are kept to a minimum. For example, in some embodiments, a total concentration of halide ions (chloride, bromide, fluoride, iodide), is kept to below 1,000 ppm. A total concentration of metallic species (e.g., Br, Cd, Co, Cr, Cu, Fe, K, Li, Mo, Na, Ni, Pb, Zn, including an at least one of an alloy and an oxide thereof), is kept to below 1,000 ppm. Further, impurities from solvents and precursors used in the synthesis process are kept below 1,000 ppm and can include, for example, bromoethane, chloroethane, 1-bromobutane, 1-chlorobutane, 1-methylimidazole, ethyl acetate, methylene chloride and so forth.

One example of a technique for purifying electrolyte is provided in a reference entitled "The oxidation of alcohols in substituted imidazolium ionic liquids using ruthenium catalysts," Farmer and Welton, The Royal Society of Chemistry, 2002, 4, 97-102.

Impurities can be measured using a variety of techniques, such as, for example, Atomic Absorption Spectometry (AAS), Inductively Coupled Plasma-Mass Spectometry (ICPMS), or simplified solubilizing and electrochemical electrochemical sensing trace heavy metal oxide particulates based on a task specific ionic liquid.

AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over 70 different elements in solution or directly in solid samples.

ICPMS is a type of mass spectrometry that is highly sensitive and capable of the determination of a range of metals and several non-metals at concentrations below one part in 1012 (part per trillion). It is based on coupling together an inductively coupled plasma as a method of producing ions (ionization) with a mass spectrometer as a method of separating and detecting the ions. ICP-MS is also capable of monitoring isotopic speciation for the ions of choice.

By reducing the moisture content in the EDLC to less than 500 part per million (ppm) over the weight and volume of the electrolyte and the impurities to less than 1,000 ppm, the EDLC can efficiently operate over a wide temperature range suited for use with the teachings herein, with a leakage current (I/L) that is less than 1,000 mAmp per Liter within that temperature and voltage range.

In one embodiment, leakage current (I/L) at a specific temperature is measured by holding the voltage of the EDLC constant at the rated voltage (i.e., the maximum rated operating voltage) for seventy five (75) hours. During this period, the temperature remains constant at the specified temperature. At the end of the measurement interval, the leakage current of the EDLC is measured.

In some embodiments, a maximum voltage rating of the EDLC is 4 V at room temperature. An approach to ensure performance of the EDLC at elevated temperatures (for example, over 210 degrees Celsius), is to derate (i.e., to reduce) the voltage rating of the EDLC. For example, the voltage rating may be adjusted down to about 0.5 V, such that extended durations of operation at higher temperature is achievable.

An energy storage 30 may be embodied in several different form factors (i.e., exhibit a certain appearance). Examples of potentially useful form factors include, a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical tool or a tool mounted in a cylindrical form factor. An annular or ring-shaped form factor may be most useful in conjunction with a tool that is ring-shaped or mounted in a ring-shaped form factor. A flat prismatic cell shaped to accommodate a particular geometry may be useful in conjunction with cylindrical, ring-shaped or other tools or tools mounted in those form factors.

Examples of cylindrical tools or tools mounted in cylindrical form factors include slickline or retrievable tools that are normally disposed in the channel within a drilling apparatus. Examples of annular or ring-shaped tools or tools mounted in ring-shaped form factors include collar-mounted tools disposed on the wall or collar of a drilling apparatus.

Some exemplary embodiments of the power system 16 with additional detail are now presented.

Generally, the power system 16 is designed and configured to operate at depths and temperatures as may be encountered in the downhole environment. Generally, the power system 16 provides energy to at least one of the survey components 15 and the downhole electronics 13, and may provide energy to any component in the logging instrument 10 or accompanying the logging instrument 10 down the wellbore 1, and that has a demand for energy that the power system 16 can provide.

First, note that the energy storage 30 may discharge an initial charge, and may also be recharged by a remote power source. Exemplary remote power sources include power that is provided by at least one of the wireline 8, a rechargeable battery, a non-rechargeable battery, a downhole generator, and by a combination of thereof. In some embodiments, the downhole power source includes a battery that is coupled to the energy storage 30, usually in close proximity so the battery must also withstand the depths and temperatures presented to the logging instrument 10. The downhole generator must also withstand the depths and temperatures presented to the logging instrument 10. Generally, the generator uses a motive force, such as a flow of mud, or vibration to generate power.

Exemplary logging instruments 10 may include a variety of tools and components used for geothermal resource development or oil and gas exploration, and may include logging while drilling (LWD) tools, measurement while drilling (MWD) tools, wireline tools, production tools and so forth. Examples of these tools may include coring tools, shut-in tools, NMR tools, EM telemetry tools, mud pulser telemetry tools, resistivity measuring tools, gamma sensing tools, pressure sensor tools, acoustic sensor tools, seismic tools, nuclear tools, pulsed neutron tools, formation sampling tools, induction tools, and so forth.

Further it is known that a variety of components may be included within such tools. The components will consume power to provide desired functionality. Non-limiting examples of these components include electronic circuitry, a transformer, an amplifier, a servo, a processor, data storage, machine executable instructions stored on or in machine readable media (referred to as "software"), a pump, a motor, a sensor (such as a thermally tunable sensor, an optical sensor), a transducer, fiber optics, a light source, a scintillator, a pulser, a hydraulic actuator, an antenna, a single channel and/or a multi-channel analyzer, a radiation detector, an accelerometer, a magnetometer and the like.

In short, any equipment that may be deployed in support of and/or as a part of the logging instruments 10 and that consumes some electrical power, or is driven by a component that consumes some electrical power, may benefit from use of the power system 16 and the accompanying energy storage 30.

Further, the logging instrument 10 may include or have an interface with any type of remote power source for charging that is deemed appropriate by a system user, designer and/or operator. Examples include low power wirelines coupled to a remote power supply, or as deemed appropriate (for example, as may be dictated by system design). Other embodiments may call for coupling the power system 16 with on board power generation, such as a mud driven generator or alternator. Selected descriptions of various downhole tools are included below for perspective.

Coring tools are typically designed to extract samples of the rock or other formation material in the downhole environment. Examples are rotary coring tools, drill coring tools, sidewall coring tools, and others. These tools typically include a motor that may demand instantaneous amounts of power not easily available from standard downhole power sources (batteries, generators, wirelines). The power available to a coring tool downhole may impact the rate of coring and/or the amount of coring material that may be extracted.

Shut-in tools may be used to isolate an area downhole in order to enhance the fidelity of measurements taken with other measurement tools in that same isolated area. The shut-in tool stops or controls the flow of fluids that may otherwise flow during a downhole drilling operation. The shut-in tool typically includes a motor that demands a high power pulse. The amount of power available to the shut-in tool determines the speed at which the shut-in tool can stop the flow of fluid.

NMR (nuclear magnetic resonance) tools may be used to determine the hydrocarbon or other content in the rock or other formations surrounding a drilled hole. NMR tools typically require fast<1 sec, very high power>1 kW power pulses to operate. The power available to an NMR tool may impact the effectiveness of that tool to measure the salient features of the formation.

EM (electromagnetic) telemetry tools may be used to transmit data from the subsurface application area to the surface using propagating electromagnetic radiation. EM telemetry tools may require high power pulses to achieve useful transmission through the rock or other formation at distances comparable to the said application depths. The power available to an EM telemetry tool may impact the range and data-rate achievable for transmission to the surface.

Mud pulser telemetry tools may be used to transmit data from the subsurface application area to the surface using propagating pressure pulses in the fluid ("mud") that normally flows in a drilled hole. Mud pulser telemetry tools may require pulsed power to generate the needed pressure variations in the mud. The power available to a mud pulser telemetry tool may impact the achievable signal fidelity.

Resistivity tools measure the electrical resistivity of the rock or other formation surrounding a drilled hole. Significantly, the resistivity of hybrocarbons differs measurably from that of typical rock and other materials that are found near drilled holes. Resistivity tools may measure the electrical resistivity with a number of methods. One method is to apply a differential potential between two physically separated points on the tool itself. The current that flows from one point to the other is then indicative of the resistivity of the formation surrounding the tool. The power available to the resistivity tool may impact the fidelity or the range of the achievable resistivity measurement.

Figure 5:
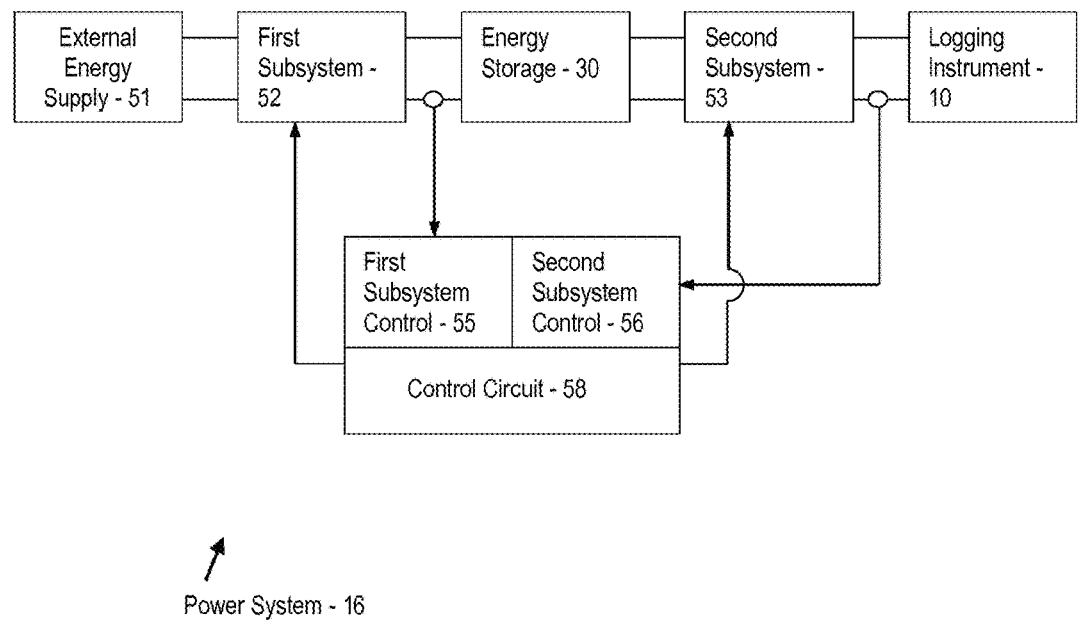
FIG. 5 illustrates an embodiment of a topology of a power system that includes a high temperature rechargeable energy storage.

Aspects of an embodiment of the power system 16 that includes rechargeable energy storage 30 are shown in FIG. 5. In this exemplary embodiment, a first subsystem 52 includes current limiting electronics and battery conditioning electronics. Due to the high power capability of the energy storage 30, the power system 16 may furnish bursts of short-duration current to the logging instrument 10. In the meantime, an external energy supply 51 (also referred to herein as a "source") may supply only relatively small but consistent current. Accordingly, one function of the first subsystem 52 is to limit current drawn from the external energy supply 51 during each burst. That is, during an interval in which the power system 16 supplies large currents from the energy storage 30 to the logging instrument 10. This function may be particularly critical when the external energy supply 51 is reliant on battery technology. That is, typical battery technologies designed for downhole operation have limited current handling capability and can fail catastrophically if too much current is demanded from them. Accordingly, the first subsystem 52 may be configured to limit the current drawn from the external energy supply 51. Further, as battery technologies may require conditioning, for example, to de-passivate the battery electrodes prior to use, the first subsystem 52 may be configured to establish the battery terminal conditions (current and voltage) needed to de-passivate electrodes of the battery.

The first subsystem 52 and the second subsystem 53 may be controlled by a first subsystem controller 55 and a second subsystem controller 56, respectively. The first subsystem controller 55 and the second subsystem controller 56 may be combined to form at least a part of a control circuit 58 (which may also referred be to as a "controller" 58).

Chemical batteries, which may include several cells, may need to be de-passivated prior to use in order to reduce their effective output impedance so that operating currents do not cause an excessive decrease in the battery output voltage. Depassivation may be accomplished in one of many ways. One exemplary method calls for drawing a constant load current from the cell for a short period of time. Exemplary currents may range from 10 mA to several amps per cell and exemplary depassivation times may range from a few seconds to several days. Current levels may be changed or pulsed or otherwise during the depassivation procedure, for instance, a battery may be loaded at 4 mA per cell for three days and then 150 mA per cell for thirty minutes. Depassivation should be performed within a specified maximum time before actual use, for example twenty four hours.

The first subsystem 52 may be controlled in order to provide the needed current draw from the battery for depassivation. The first subsystem 52 may also incorporate measurement apparatus for determining the need for depassivation. An exemplary implementation including components for automatic depassivation is described below. A voltage and/or current sensor (not shown) may be disposed between the external energy supply 51 and the first subsystem 52. The first subsystem 52 may be controlled by way of the control circuit 58 or by a separate control circuit (not shown) to draw a specified current from the battery, for example 100 mA. If the resulting voltage presented by the external energy supply 51 under the specified current load falls below a specified voltage threshold (which may be determined a-priori to represent passivation conditions within the battery) within a specified time (for example 100 ms), then the first subsystem 52 may determine that depassivation is required and otherwise not required. As example, 26 V is a common threshold for an eight cell moderate rate Li-thionyl chloride battery pack. If the first subsystem 52 determines that depassivation is required, it may be controlled to draw a specified current for depassivation as exemplified above.

A battery is generally effectively de-passivated by drawing a specified depassivating load current and monitoring the battery voltage until it rises to a specified level. In one example, battery passivation is determined if a 28 V moderate rate battery voltage drops below 26 V while drawing approximately 100 mA from the battery. If it does, the battery is then normally de-passivated by drawing approximately 200 mA until the battery voltage rises above 26 V. Thus an automatic de-passivation may draw approximately 100 mA from the source and monitor the voltage. If the voltage falls below 26 V for a 28 V battery, the system may then draw 200 mA from the battery and monitor the voltage. De-passivation may be halted, for example, once the power system 16 measures a battery voltage above 26 V.

The depassivation current drawn from the battery may yield a corresponding current at the output terminals of the first subsystem 52 which may be directed to the energy storage 30, in which case the energy storage 30 will be charged during depassivation. This method may be useful when the energy storage 30 is in need of charging current. The current may also be directed to a dummy resistor or a zener diode or a combination thereof (not shown), or the like as an alternative. These alternatives may be useful when the voltage is already at or near the rated voltage of the energy storage 30.

Figure 6:
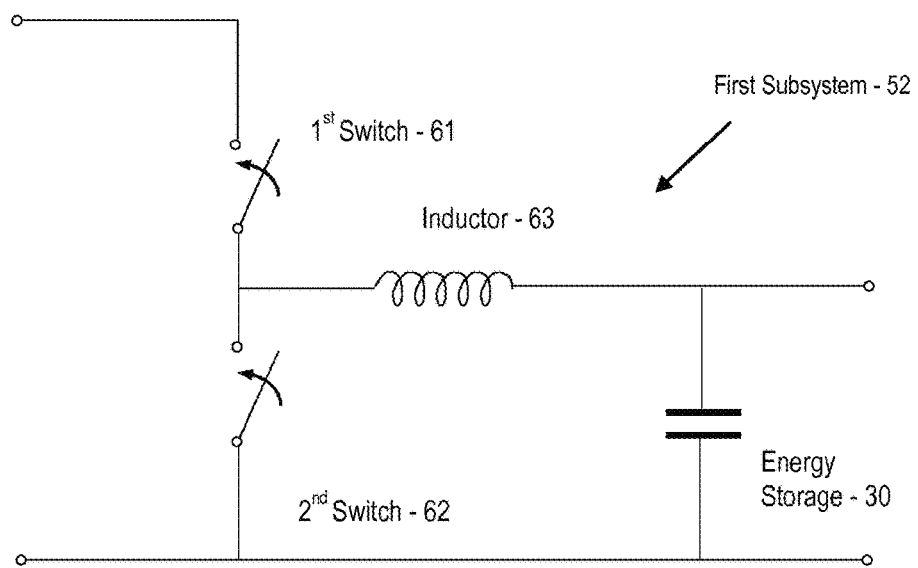
FIGS. 6-8 illustrate aspects of the topology of FIG. 5.

As shown in FIG. 6, an exemplary embodiment of the first subsystem 52 includes a first switching device 61, and a second switching device 62 as well as a filter inductor 63. The external energy supply 51 may couple to the first subsystem 52 and to the energy storage 30 (for example, a high temperature ultracapacitor). The action of the first switching device 61 and the second switching device 62 may be controlled to achieve current limiting and battery conditioning features described above. Specifically, the relative on-time of the first switching device 61 and the second switching device 62 operating in a complimentary fashion (duty ratio) may be used to adjust the conversion ratio and the flow of current. The exemplary first subsystem 52 shown in FIG. 6 may be useful when voltage of the external energy supply 51 is larger in value when compared to voltage of the energy storage 30. Current limiting or regulation may be achieved by way of a feedback control system (not shown).

An exemplary embodiment of the second subsystems 53 includes power converters either DC-DC or DC-AC depending on the tool requirements. A function of a second subsystem 53 may be to regulate the voltage or current delivered to the logging instrument 10. Due to a capacitive nature of the energy storage 30, when implanted with an ultracapacitor, voltage of may decrease in an approximately linear fashion as charge is withdrawn from the energy storage 30. A function of the second subsystem 53 then may be to regulate the voltage or current delivered to the logging instrument 10, despite the varying voltage presented by the energy storage 30. Voltage limiting or regulation may be achieved by way of a feedback control system (not shown).

Figure 7:
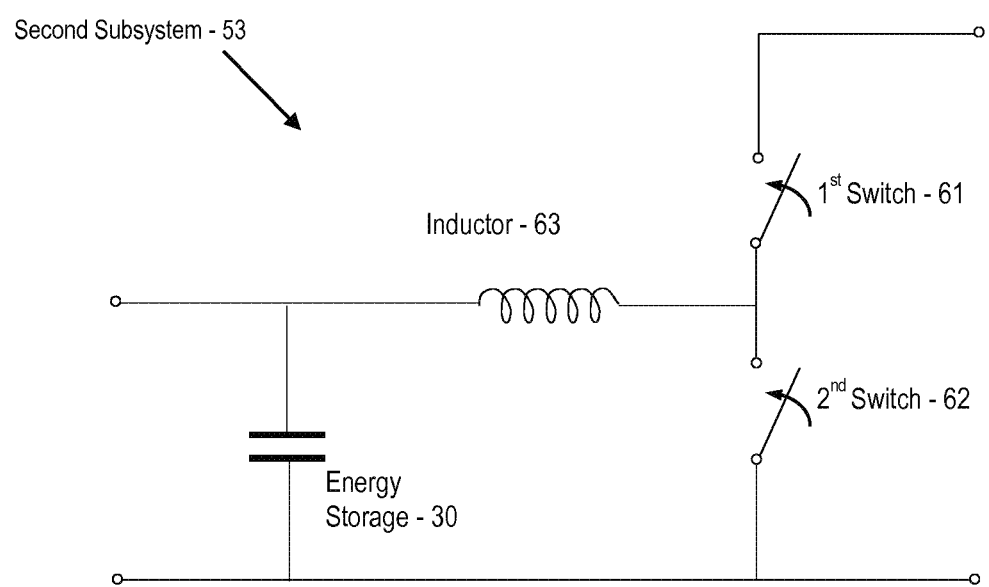

As shown in FIG. 7, an exemplary embodiment of the second subsystem 53 may include respective embodiments of the first switching device 61, the second switching device 62 as well as the filter inductor 63. The logging instrument 10 may couple to the second subsystem 53 and to the energy storage 30. The action of the respective embodiments of the first switching device 61 the second switching device 62 may be controlled to achieve desired current or voltage regulation features described above. Specifically, the duty ratio of the relative on-time of the respective embodiments of the first switching device 61 and the second switching device 62 may be used to adjust the conversion ratio and the flow of current or the presented voltage. The exemplary second subsystem 53 shown in FIG. 7 may be useful when the voltage required is larger in value when compared to the voltage of the energy storage 30. Voltage limiting or regulation may be achieved by way of a feedback control system (not shown).

Figure 8:
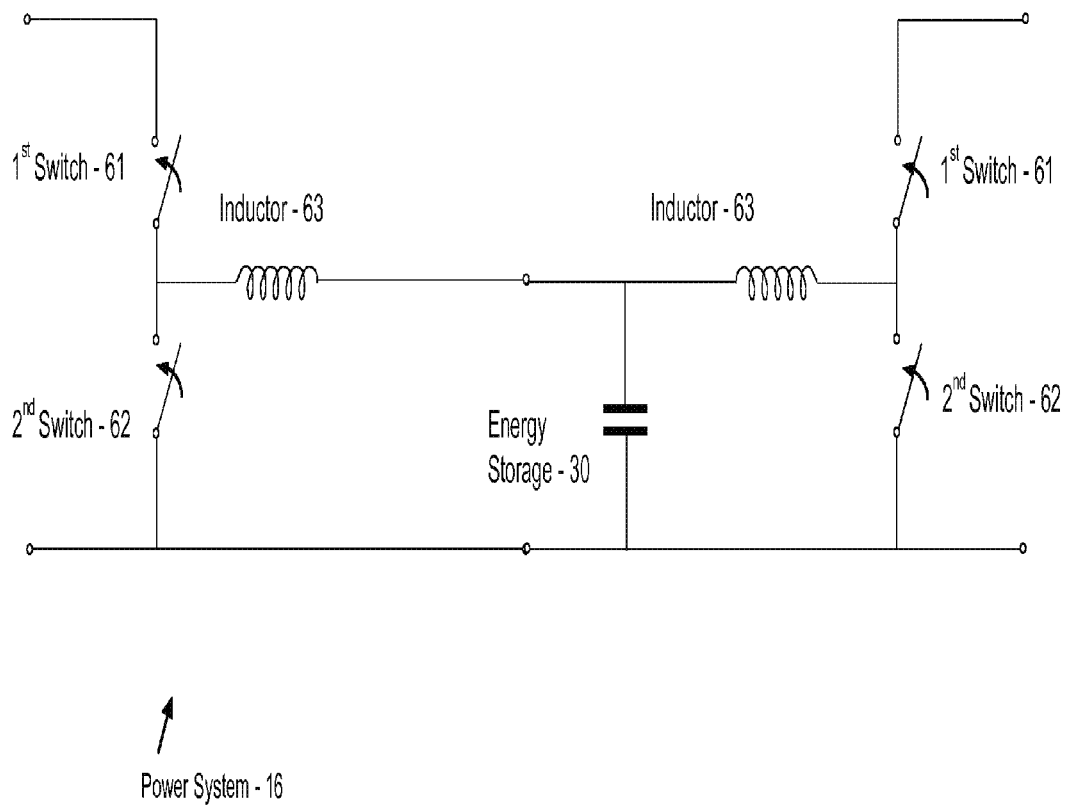

As shown in FIG. 8, the first subsystem 52 and the second subsystems 53 may be coupled together and to the energy storage 30 as well to provide an embodiment of the power system 16. In this embodiment, the exemplary power system 16 may be particularly advantageous when the terminal voltage of the external energy supply 51 is either larger in value or smaller in value when compared to the terminal voltage of the logging instrument 10 as long as the terminal voltage of the energy storage 30 is smaller in value than both.

In some embodiments, the power system 16 may be configured for low standby power consumption. This feature is advantageous in remote and harsh environments where power is scarce. Low standby power consumption may be achieved by incorporating low-power or micro-power gate drive circuitry and control electronics in the control circuit 58. Additionally, an overall standby power consumption may be reduced significantly by incorporating a sleep state for the power system 16 (discussed further below). In some embodiments, the low-standby power state may be characterized by a power down of circuitry to operation of only that circuitry that is required for power processing to deliver power to the load or logging instrument 10 or for any application requiring only a subset of circuitry. Sensing circuitry may be incorporated to determine when the logging instrument 10 is not demanding power (active) or when the energy storage 30 is not in need of recharging current.

In some embodiments, a current sensor (not shown) may be disposed on an interconnect between the first subsystem 52 and the energy storage 30. The current sensor may measure current draw from the energy storage 30. When the current draw falls below a certain threshold, a logic control circuit (such as logic included within control circuit 58) may power-down a majority of the first subsystem controller 55. The control circuit 58, in its sleep state, may then intermittently, but in some instances, on a time-scale much faster than the transient current demanded by the energy storage 30, awaken the first subsystem 52, and poll the current sensor to determine if the energy storage 30 is in need of recharging.

As another example, a separate current sensor may be disposed on an interconnect between the second subsystem 53 and the logging instrument 10. This latter current sensor may be used to measure current draw by the logging instrument 10. When that current draw falls below a certain threshold, a logic control circuit that may be within the control circuit 58 may power-down a majority of the second subsystem controller 56. The control circuit 58, in its sleep state, may then intermittently, but in some instances, on a time-scale much faster than the transient current demanded by the logging instrument 10, awaken the second subsystem 53 and poll the current sensor to determine if the logging instrument 10 is active.

As the energy storage 30 may exhibit a number of varying forms, the energy storage 30 can be configured to integrate into the logging instrument 10. For example, the logging instrument 10 may include an annular shaped energy storage 30, such as an annular shaped ultracapacitor. In this embodiment, and by way of non-limiting example, the energy storage 30 may surround a mud channel or other equipment in the drill string 11. The energy storage 30 may be segmented or otherwise divided to accommodate form requirements and be coupled in series or in parallel as appropriate for the needs of the user.

In some embodiments, an automatic bypass is included in the power system 16. That is, many applications may benefit from fail safe features. The "bypass" feature may be useful when any of the components of the power system 16, such as the first subsystem 52 the energy storage 30, the second subsystem 53 or the control circuit 58 or any other critical components fail to operate properly. In that case, it may be useful to connect the external energy supply 51 directly to the logging instrument 10 so that the external energy supply 51 may still provide utility despite the failed components. In some embodiments, the bypass feature automatically determines a failed state of a critical component and supplies an alternative current path from the external energy supply 51 to the logging instrument 10. Because the bypass feature is useful upon the occurrence of failed components and because of the inherent uncertainty therein, the bypass feature may, in some embodiments, provide for automatic operation. That is, the design may provide that the bypass feature is disabled by proper functioning of the respective critical components subject to the bypass. In some embodiments, such as where components are subject to high levels of shock and vibration, the bypass feature may be implemented with solid-state devices which may be more robust in the environment than equivalent electromechanical switches, relays or the like.

One exemplary solid-state device that may be particularly useful in implementing the solid-state automatic bypass feature is a semiconductor device called a junction field effect transistor (JFET). A JFET is a device having at least three terminals, normally called gate, drain and source respectively that is "normally on," meaning the device may reasonably pass current unless a control voltage is imposed between the gate and the source of the JFET. An exemplary method for exploiting a JFET for automatic bypass is to connect the drain of the JFET to the high potential output terminal of the external energy supply 51 and the source of the JFET to the high potential terminal of the logging instrument 10. Additional functionality may be included in the control circuit 58 or in a separate control circuit (not shown). The functionality may derive a gate to source drive voltage useful for turning off the JFET. That gate to source drive voltage may be derived from a voltage or signal within the circuit that represents proper functioning of all critical components. Many such signals or aggregates of such signals may be derived from measurements by way of measurement apparatus for voltage and or current or otherwise. One indicative and exemplary signal that may be particularly useful for indicating proper functioning of the power system 16 is terminal voltage of the energy storage 30. For instance, if the energy storage 30 falls below a useful voltage threshold, this may be construed as a failure of the first subsystem 52, thus indicating a loss of charging current from the external energy supply 51. This condition may also be taken construed as a failure of the second subsystem 53 indicating an excess discharging of the energy storage 30 to the logging instrument 10. Either of these conditions may also indirectly represent a failure of the control circuit 58, and so this exemplary signal may in some cases be sufficient to determine proper functioning of the system components. That signal then may be used to drive the gate to source voltage of the JFET directly or in effect directly, so that when it falls below a given threshold, the JFET will automatically revert to an undriven state, that is a state that allows reasonable currents to flow from a drain of the JFET to source terminals of the JFET.

In further embodiments, it may be desired to include a current limiting feature. Consider that a chemical battery or other power source may require a current limit to prevent undervoltage of the battery terminals, damage of the internal components of the battery, overheating of the battery, excessively fast discharge, accelerated aging or passivation of the battery, catastrophic failure of the battery and so on. A safety current limit may be implemented in the power system 16 in many ways. Two exemplary methods for implementing the safety current limit described here may be used alone or in combination.

The first method exploits control circuitry, such as circuitry shown in FIGS. 5-8. For example, the control circuit 58 may derive a measurement of the power source current from the current sensor and a state knowledge any voltage and current conversion ratio achieved by the power conversion in the first subsystem 52. It may also derive a measurement of the power source current from the current sensor that may be disposed between the external energy supply 51 and the first subsystem 52.

The first subsystem 52 then may be controlled, for instance, by adjusting the relative on-time of the first switching device 61 and the second switching device 62 by operating in a complimentary fashion (duty ratio) to adjust and thereby limit the flow of current to a predetermined or otherwise determined value.

Figure 9:
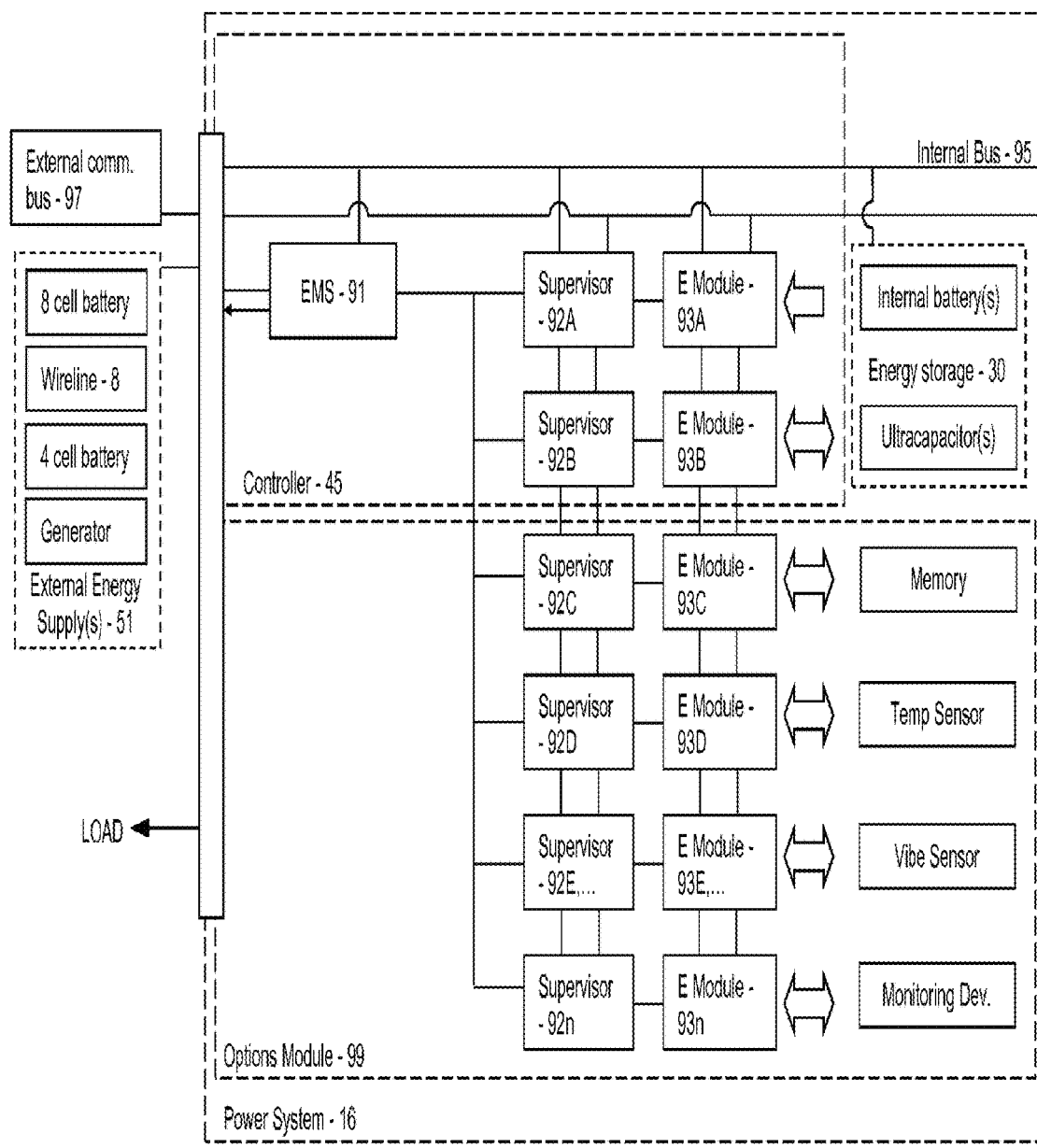
FIG. 9 illustrates another embodiment of a topology for a power system that includes high temperature rechargeable energy storage.

Referring now to FIG. 9, another embodiment of the power system 16 is shown. In the exemplary embodiment depicted in FIG. 9, the controller 45 may be in electrical communication with an optional options module 99. Generally, the controller 45 communicates with and controls the energy storage 30 through a electronics management system (EMS) 91 circuit. The electronics management system (PEMS) 91 circuit may be in communication with (or, in some embodiments, include within the EMS 91), at least one supervisor 92 which may include a respective electronics module 93. The optional options module 99 may also include a plurality of supervisor 92 circuits, each of which may also include respective electronics modules 93. Generally, the electronics management system (EMS) 91 is in electrical communication with each of the supervisors 92 through an internal bus 95.

As a matter of convention, the internal bus 95 may communicate energy within the power system 16, as well as control signals and the like. Accordingly, the internal bus 95 may include a plurality of conductors, as well as non-conductive elements (such as fiber optic and the like). Thus, it should be considered that the representation of the internal bus 95 is intentionally simplistic, and is not to be considered limiting of internal communications within the power system 16.

Generally, power is provided to the power system 16 from at least one external energy supply 51. Exemplary sources of external energy include at least one battery, a remote power source (such as via wireline 8), and at least one generator. In some embodiments, the electronics management system (EMS) 91 receives energy from the external energy supply 51, and stores the energy in the energy storage 30. In general, the electronics management system (EMS) 91 is configured to manage charging and discharging of a variety of types of energy storage 30. For example, the electronics management system (EMS) 91 may be configured to manage charging and discharging of ultracapacitors as well as at least one type of battery. The electronics management system (EMS) 91 may draw on the energy storage 30 to provide a variety of energy forms. For example, pulses of power higher than those previously available down the wellbore 1 from a conventional external energy supply 51 may be provided. Electrical properties for one exemplary embodiment are provided in Table 1 below. Of course, these properties may be adjusted with changes in design and/or scale, or other such parameters.

The at least one generator may be reliant on any one or more of a variety of technologies. Exemplary generators include generators that may be classified as a flow-driven generator (e.g., a turbine); a displacement generator; a thermovoltaic generator; and the like.

In one embodiment, such as the embodiment of FIG. 9, electronics included in the power system 16 are at least partially implemented using digital logic. For example, the electronics management system (EMS) 91 circuit may include a digital circuit. One example of a digital circuit for the EMS 91 is a microprocessor, model PIC18F4680, available from Microchip Technology Inc. of Chandler Ariz. The EMS 91 may communicate using a digital protocol with a plurality of supervisors 92. Each of the supervisors 92 may include a digital circuit. One example of a digital circuit for the supervisor 92 is a microprocessor, model PIC12F615, available from Microchip Technology Inc. of Chandler Ariz. Generally, each of the supervisors 92 receive data over a data bus 94. When an instruction for a respective one of the supervisors 92 is received, the respective supervisor 92 (A-n) performs an assigned function. For example, supervisor 92A may receive an instruction from the EMS 91 to draw power from an internal battery. Accordingly, supervisor 92A commands a respective electronics module 93 (in this case, electronics module 93A), to draw on the internal battery that is contained in the energy storage 30. In this example, the electronics module 93A includes a power converter and appropriate switching.

The options module 99 may be included in the controller 45 (as in addition to the controller 45, physically separate therefrom). Generally, the options module 99 includes components that may be beneficial for efficient energy management and/or provide users with useful information. In some embodiments, each option of the options module 99 includes a respective supervisor 92*n* and electronics module 93*n*. In these embodiments, each of the supervisors 92 may include a digital circuit. One example of a digital circuit for the supervisor 92 is a microprocessor, model PIC12F615, available from Microchip Technology Inc. of Chandler Ariz. Generally, each of the supervisors 92 receive data over the data bus 94 which may be shared with the electronics management system (EMS) 91. When an instruction for a respective one of the supervisors 92 is received, the respective supervisor 92 (A-n) performs an assigned function. For example, supervisor 92D may receive a request from the EMS 91 for a temperature reading. Accordingly, supervisor 92D commands a respective electronics module 93 (in this case, power electronics module 93D), to ascertain temperature from, for example, a resistive element. As another example, the EMS 91 may command supervisor 92C to store data. Accordingly, the respective supervisor 92C provides data, logging instructions and the like to the respective electronics module 93C.

Each of the electronics modules 93*n* may include devices as appropriate to execute the intended functionality. For example, at least one power converter may be included, as well as an integrated circuit, an IC chip, a microcontroller, a capacitor, resistor, inductor and other similar components and assemblies of components.

The options module 99 may be fabricated and provided as a customized and modular unit. That is, each options module 99 may be built with a certain functionality in mind while making use of a common communications protocol.

The controller 45 may include an interface to an external communications bus 97. The external communications bus (ECB) 97 may be configured for communication with other tooling onboard or in communication with the logging instrument 10. Exemplary other tooling includes a mud-pulser, other microcontrollers, digital and/or analog circuits and the like. The ECB 97 may use a proprietary protocol, or may use commercially available protocol(s). Using the ECB 97, a user may, for example, send at least one command to the EMS 91 from the topside equipment 7. The at least one command may call for by way of example, changes in voltage, actuation of any option, reading of stored data, and the like. The ECB 97 may also provide periodic communications, such as communication of routine data logging to the topside equipment 7.

Prior to discussing optional features in general, and in particular electrical aspects thereof, it should be noted that the embodiments provided are not limiting and merely illustrative. For example, components and/or features may be moved about (i.e., related in different ways) within the power system 16, and some components and/or features may be provided outside of the power system 16. Some combinations of aspects of the various features described herein may be realized in other forms, or to present other functionality not discussed herein. Some aspects of the features described herein may be omitted, while other aspects of the features may be supplemented with technology not presented herein. It should also be noted that the overview provided herein is presented as an abstraction of the technologies and capabilities of the power system 16, and is therefore merely illustrative of aspects of the power system 16. That is, for example, the drawings and related discussions of embodiments of the power system 16 as well as features, components and functions thereof, merely present non-limiting relationships and capabilities and are not intended to be construed as electrical diagrams and the like.

A variety of additional components and features may be included in the options module 99. Examples of additional components (which are not illustrated herein) include, without limitation, memory, at least one accelerometer, a magnetometer, a voltage measuring device, a gyroscope, a temperature sensor, a vibration sensing and measuring device, a shock sensing and measuring device, a flow sensing and measuring device, a current sensing and measuring device, at least one programmable interface and circuit, any one or more of a plurality of customized solutions (some of which are introduced below) and the like. These and other components may provide for, among other things, data logging, data transmission, measuring and/or controlling voltage, measuring and/or controlling current, as well as monitoring of temperature, shock, vibration, flow, orientation, trajectory, position and the like. In some embodiments, the additional components are provided in an additional module (not shown), which may be coupled to the power system 16 via, for example, a common bus. The module may be disposed, for example, between the controller 45 and an interface.

In general, the power system 16 disclosed herein is adapted for operation in the harsh environment encountered downhole. For example, the energy storage 30 and the power system 16 as a whole are, in some embodiments, adapted for operation in a temperature range from ambient temperatures topside (although the power supply 16 may be configured for operation in temperatures as low as about minus forty degrees Celsius) to about one hundred and seventy five degrees Celsius, or up to about two hundred degrees Celsius. In some embodiments, the energy storage 30 is adapted for operation at temperatures up to about two hundred and fifty degrees Celsius.

Some additional electrical functions and aspects of implementation of these functions are now presented. In general, and by way of example only, these features may be implemented as subordinate to (i.e., controlled by) a respective supervisor 92 and electronics module 93. Although these features are presented in the context of FIG. 9, these features are not limited to practice with the embodiment depicted therein.

Exemplary additional functions that may be included in the power system 16 include voltage simulation; state-of-charge monitoring; change-over control; output voltage optimization; dual-mode control; temperature protection; sleep mode; memory logging; component bypass; and adaptive voltage control, among others. It should be noted that some of these additional features are not mutually exclusive. That is, it is anticipated that at least one additional feature may be in use at any given time, and that implementation of that additional feature will not conflict with operation of other features. Some of these additional aspects and functionality are now presented.

A first one of a variety of features that may be included in the power system 16 is that of voltage simulation. For example, a voltage simulator may be included as an option within the options module 99 (or incorporated into the power system 16 in other ways, where no options module 99 is employed). In general, the voltage simulator simulates (or "mimics") electrical properties of another types of energy supply.

Figure 10:
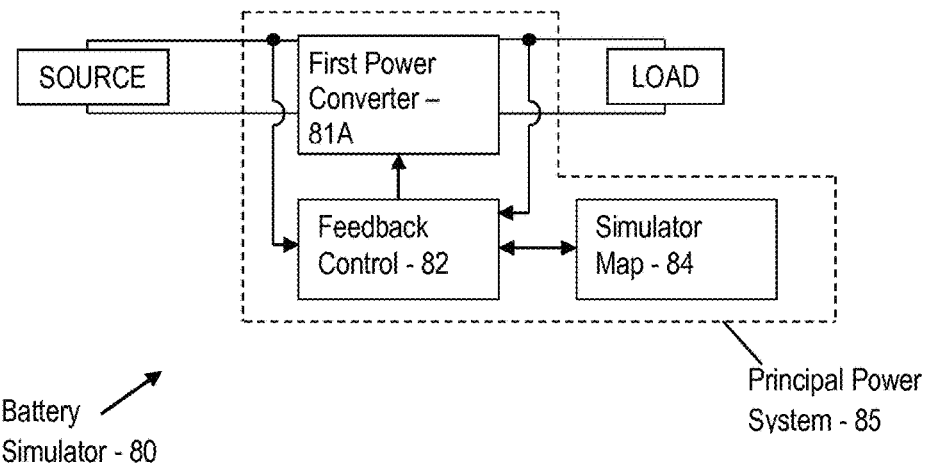
FIG. 10 is a block diagram depicting one embodiment of a battery voltage simulator.

Referring now to FIG. 10, there is shown an example of a simulator 80 which includes a principal power system (PPS) 85. The principal power system 85 is depicted as being coupled to a source as well as a load. The source may be, for example, an energy storage 30 such as an ultracapacitor. The load may be any equipment that presents a demand for energy. Non-limiting examples of loads include pumps, motors and the like, as well as electronics such as sensors, computing components and the like. The load(s) may be disposed within other tooling, such as the logging instrument 10.

In this exemplary embodiment of the principal power system 85, a power converter 81, a feedback controller 82 and a simulator map 84 are included. In general, the components used in the principal power system 85 are known in the art of power control systems. Each of the power converter 81, the feedback control 82 and the simulator map 84 are described in greater detail below. In general, the power converter 81 receives power from the source and converts the power. The conversion is governed by the feedback controller 82, which in turn controls an output signal of the power converter 81 according to the simulator map 84.

Figure 11A:
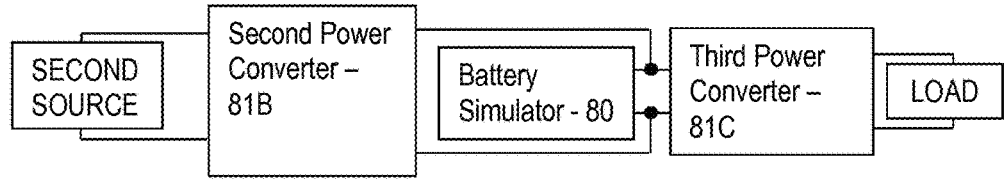
FIGS. 11A and 11B, collectively referred to herein as FIG. 11, are block diagrams depicting a parallel embodiment and a series embodiment of a battery voltage simulator, respectively.
Figure 11B:
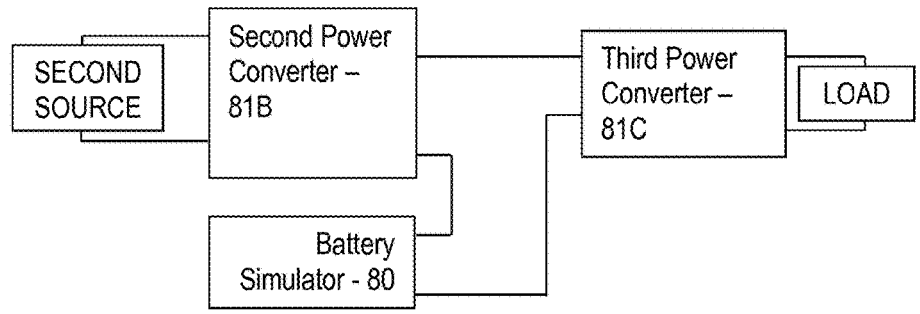

FIG. 11 depicts some exemplary system configurations that include the battery simulator 80. FIG. 11A represents an embodiment of a parallel connection between an output of the battery simulator 80 another source. FIG. 11B represents an embodiment of a series connection between output of the battery simulator 80 and another source. Optional power converters (the second power converter 81B and the third power converter 81C) may be included. The optional power converters 81B, 81C may be included, for example, to harmonize output of the battery simulator 80 and the additional source or the load. Other combinations are possible. For example, a plurality of battery simulators 80 could be coupled, many secondary sources could be coupled, and a combination of parallel and series configurations could be realized. In short, a variety of configurations may be realized, and may generally include as many sources, loads, power converters and the like as needed.

Each of the power converters 81(A, B, C, . . . n) may generally be of any topology. Non-limiting examples include converters commonly referred to as "buck," "boost," "buck-boost," "flyback," "forward," "switched capacitor," and other isolated versions of non-isolated converters (e.g., CU, buck-boost), as well as cascades of any such converters (e.g., buck+boost).

In some embodiments, each of the power converters 81 (A, B, C, . . . n) may support bi-directional power flow, especially when the source or at least one additional source (s) are rechargeable.

Figure 12:
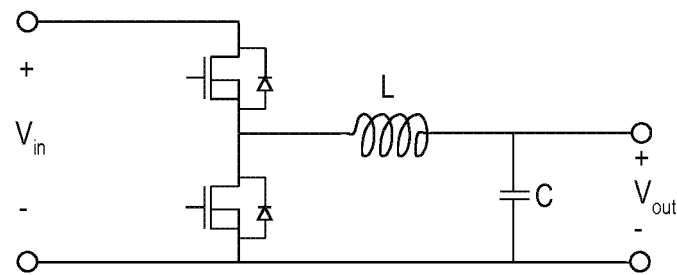
FIGS. 12-14 are block diagrams depicting embodiments of a converter for the voltage simulator of FIGS. 10 and 11.

An exemplary converter 81 is shown in FIG. 12. In this example, the converter 81 is a bi-directional buck converter. This embodiment is suitable for, among other things, use as a power converter when the output voltage is required to be less than the input voltage.

Figure 13:
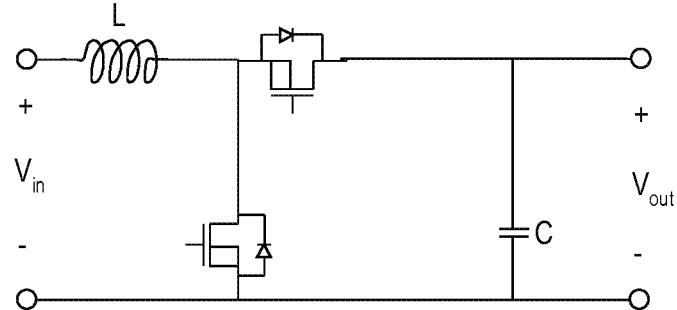
Figure 14:
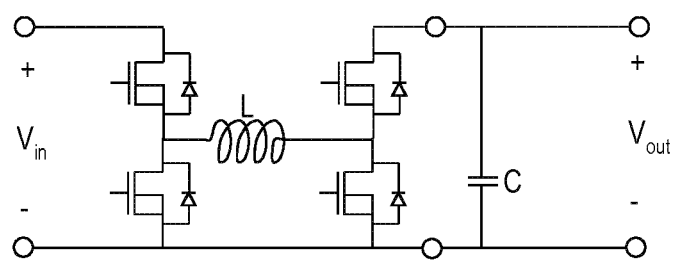

Another exemplary converter 81 is shown in FIG. 13. In this example, the converter 81 is a bi-directional boost converter. A further exemplary converter 81 is shown in FIG. 14. In this example, the converter 81 is a merged bi-directional buck-boost converter.

Figure 15:
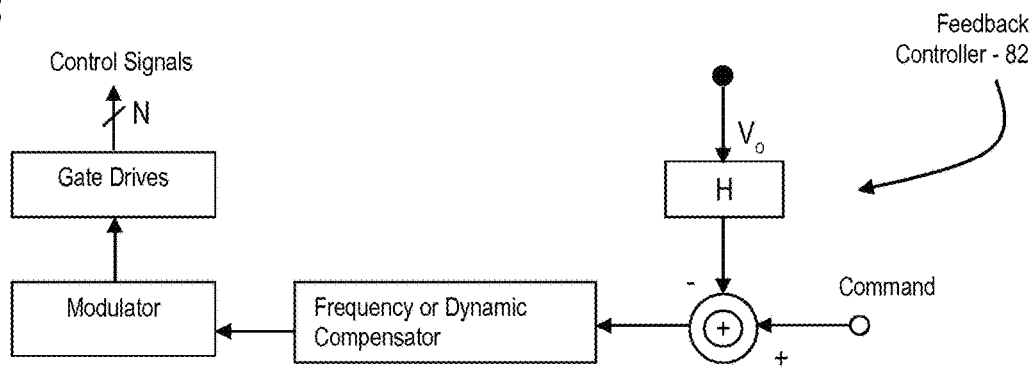
FIG. 15 is a block diagram depicting an embodiment of a feedback controller for the voltage simulator of FIGS. 10 and 11.

An exemplary embodiment of the feedback controller 82 is provided in FIG. 15. The components shown therein may be implemented in analog or digital domains, or in a combination, as determined appropriate by a designer, manufacturer or user. The feedback controller 82 may include elements for monitoring and controlling various properties. For example, the feedback controller 82 may include components for frequency compensation, pulse width modulation, deadtime protection, duty cycle limiting, providing for a soft start (i.e., ramping voltage) and the like.

The simulator map 84 may be implemented in a variety of ways. For example, in "analog" embodiments, the simulator map 84 may be implemented through use of an actual replica of the simulated source (for example, with a smaller version of the simulated source). In some of these embodiments, the replica may be charged and discharged with associated replica components.

In other embodiments, referred to as "digital" embodiments, a microcontroller (coupled to memory, analog-to-digital converters, digital-to-analog converters and the like) senses a state of the source and maps (i.e., correlates) output conversion to known characteristics. More specifically, and by way of example, the microcontroller senses the state-of-charge of the source via an analog to digital interface (for example, through an analog to digital converter), evaluates the desired (expected) output from a battery according to a data table, curve, an algorithm, or other data set that is retrieved from memory, and then governs an output of the power converter 81 accordingly. The result is output from the microcontroller via a digital-to-analog interface (e.g., a digital-to-analog converter). The analog output thus influences the "command" voltage for the feedback controller 82. Separation between analog and digital may be realized at various places in the principal power system 85. For example, the feedback controller 82 may be fully implemented in a microcontroller, where the command is not passed as an analog signal, but rather internally to the microcontroller (or over a bus if, for example, a plurality of microcontrollers is used). Generally, conversion from analog to digital and back may be realized anywhere in the principal power system 85 that is deemed appropriate by a system designer, manufacturer or user.

The commanded or regulated aspect of the power converter 81 (for example, the output voltage) may generally include any property or characteristic as is practicable. For example, output current, output voltage, output power or a mix of output voltage, current and power may be controlled. Other aspects include impedance, output resistance, and other such parameters. Generally, the output includes direct current (DC). However, in some embodiments, alternating current (AC) is provided.

The sensed property of the source (the capacitor in the above examples) may generally consider any aspect deemed appropriate. For example, the sensed property(s) may include voltage, charge, impedance, current, temperature, and the like.

Figure 16:
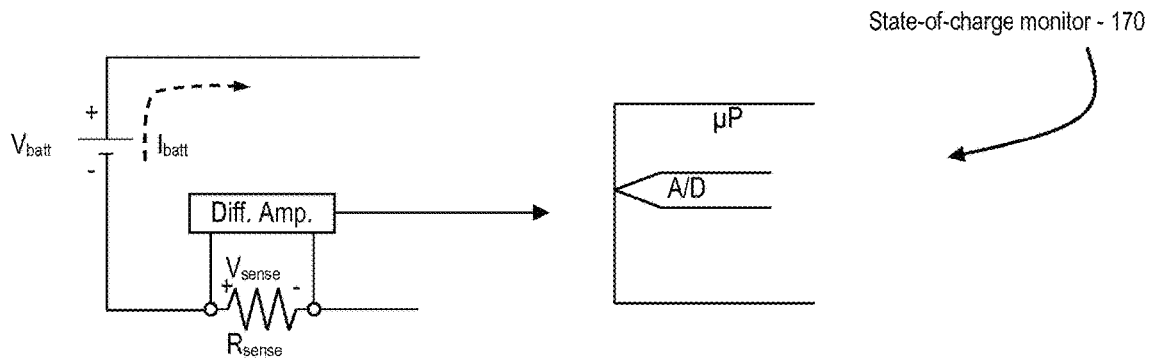
FIG. 16 is a diagram that depicts aspects of a state of charge monitor.

Referring now to FIG. 16, there are shown aspects of an exemplary state of charge monitor 170. In FIG. 16, current from a battery is measured ($I_{batt}$) by way of a voltage measurement ($V_{sense}$) across an in-line sense resistor, Dense. The current may be deduced from the voltage measurement through knowledge of the resistance value, $R_{sense}$ (in Ohms). For example, by use of the relationship given in Eq. (1):

$$I_{batt}=V_{sense}/R_{sense} \qquad (1).$$

The current may also be sensed by other techniques. For example, in some embodiments, the current may be sensed by way of a hall effect sensor or inductive sensor.

Generally, the power source (e.g., battery) is initially charged to a full state-of-charge. The monitor measures voltage on a periodic basis, such as once per millisecond. The measuring may be performed, for example, at an analog-to-digital converter (ADC). Further, one may use this method to update a state-of-charge variable in memory, rather than storing a full record of current over time. Thus, by calculating state-of-charge, there is no need to store a substantial amount of data from measurements. This may be particularly useful for transmitting state-of-charge conditions from the monitor to a remote receiver, such as from a downhole monitor to a topside receiver, or when memory available downhole is in limited supply.

Another aspect of the power system 16 that may be included as an optional feature is that of change-over control. In a variety of embodiments, the energy storage 30 may include a plurality of energy sources. When provided with the plurality of energy sources, the power system 16 may need to select particular ones of the energy sources to provide power. For instance, in some cases, the power system 16 may draw upon two batteries. In one state, the power system 16 may draw from a first one of the batteries. Once the first battery has reached a prescribed state (for instance, once the first battery has been substantially depleted), the power system 16 may draw power from another source, such as a second one of the batteries. Thus, a change-over of sources is necessitated.

Note, however, that change-over is not necessarily as simple as switching between sources. For example, the power system 16 may draw power from another source alone or the power system 16 may draw power from a combination sources including the first source and another source. In one example, the power system 16 monitors voltage presented by one battery during discharge. The power system 16 will measure the loaded voltage, the open-circuit voltage, or a combination of the two. In some instances, the power system 16 will time average the battery voltage over periods that include both loaded and unloaded states. The power system 16 will use source voltage as an indication of remaining life for the source. In some embodiments, the power system 16 will also use (in conjunction or separately) a state of charge monitor scheme that measures the current supplied by the energy storage 30 and records the product of current and time and compare it to a-priori known value of a full state of charge capacity as an indication of remaining life and control the changeover accordingly. The power system 16 may also use any other method or any combination of methods deemed useful or appropriate by the designer to determine remaining life of a respective source or to indicate a needed changeover. The changeover may be implemented between batteries, wirelines, generators, ultracapacitors, and any other form of energy source or combinations thereof as deemed appropriate or necessary by the designer, user, manufacturer or other interested party.

Changeover can be implemented any number of ways. One example employs active devices (for instance MOSFETs) in the current path for the various energy sources to be selected by the changeover controller. For ground-referenced logic-level input MOSFETs, the system PEMS 91 or respective supervisor 92 may provide logic level control signals between the gates and sources of the MOSFETs to activate them. For instance, to activate one source and deactivate another, the changeover MOSFET for the first source can be activated making a closed circuit connection between the first source and the power system 16 and the changeover MOSFET for the second source deactivated breaking a closed circuit connection between the first source and the power system 16. If ground-referenced MOSFETs are not suitable for any reason, MOSFETs may be similarly placed in a high potential current path. In this case, the gate to source voltage of the MOSFET may require a level shift circuit to confine the gate to source voltage presented at the MOSFET terminals to a safe range. In any case, the designer should consider the direction of inherent body diodes in active devices in order to effectively block current when a circuit is intended to be broken. Relays, analog switches, fuses, resettable fuses, transistors, isolated gate drives or isolated active devices, and any number of devices may all be useful in implementing changeover control. Changeover control may also be implemented in a more linear fashion. For instance, the amount of power drawn from one source may be controlled over a continuum for instance, by controlling a resistance placed in the current path of that source. This may also be implemented with transistors. The control signal in this case should resemble an analog rather than a digital or binary signal.

A control signal commanding a change among sources (referred to as a "changeover command," and by other similar terms) can be generated within the EMS 91 or respective supervisor 92. The changeover command may be generated digitally, analogically, or with a mix of signals, and may be generated outside of the EMS 91 or supervisor 92, such as by any technique deemed appropriate.

Change over may be manifested in any number of ways. For instance, the change over may switch between batteries, it may switch from one battery to a combination of two or several batteries or from one combination to another combination, it may switch any number of times in a given time period, it may switch repeatedly back to a state or between several states, in this way it may modulate between states to achieve an effective time-average behavior, it may switch among any combination of types of energy sources for instance, wireline, generator, batteries, capacitors, flywheels or any other source deemed useful. The changeover control may be informed by any information such as state of charge of an energy source, voltage presented by a source, impedance presented by an energy source, ambient temperature, vibration or other measurements, signals received from a remote location such as the surface in an oil and gas drilling application or any other source of information.

Figure 17:
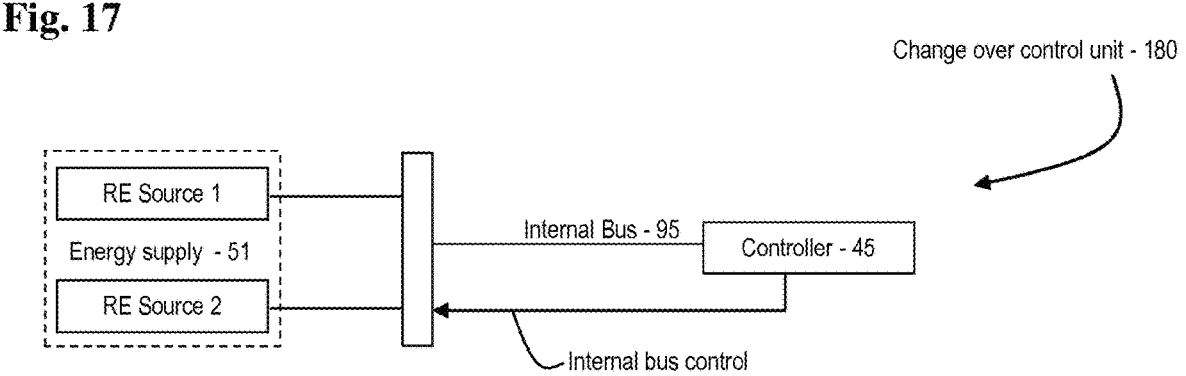
FIG. 17 is a diagram that depicts aspects of a change over control unit.

In FIG. 17, aspects of a topology for an exemplary change over control unit 180 are shown.

Given the variable and extreme environmental conditions in which the power system 16 will operate, a self adjusting voltage control feature may be included to ensure operability of the power system 16.

A voltage adaptation circuit may be included in some cases to control a maximum voltage of the energy storage 30. Control may be according to temperature or some other external measurement (e.g., another environmental measurement), for example. More specifically, in some embodiments, the energy storage 30 will become increasingly unstable with increasing temperature. Often, the instability is ameliorated by limiting the voltage supported by the energy storage 30. For a high temperature ultracapacitor, as temperature increases so may power capability and energy capacity (as a result of decreasing effective series resistance and increasing capacitance at elevated temperatures). Meanwhile both power capability and energy capacity increase with (the square of) the ultracapacitor voltage. Thus at elevated temperatures, voltages may be reduced while at least partially preserving power capability and energy capacity as a result of decreasing effective series resistance and increasing capacitance at those temperatures. By decreasing voltages at elevated temperatures, stability of the energy storage 30 may be improved at those elevated temperatures. This results in an attendant increase in a lifetime of the energy storage 30. This further permits extension of a maximum temperature rating of the energy storage 30 and therefore, in some embodiments where temperature rating of the energy storage 30 is determinative, an extension of the maximum temperature rating for the power system 16. As an example of voltage adaptation, management of string voltage according to temperature may be implemented, for example, by providing a variable voltage set point for power conversion, where the variable set point varies according to measurements of temperature. In one embodiment, temperature is measured by a thermocouple coupled to the EMS 91, the PEMS 91 in turn sends a voltage set point command to a respective supervisor 92. Upon receipt of the voltage adjustment command, the respective supervisor 92 may control a power converter control circuit which adjusts the nominal or maximum voltage output of the power converter control circuit.

Another exemplary feature of the power system 16 is that of multiple mode control. Multiple mode control (MMC) may be implemented to control multiple sets of aspects of the power system 16. For instance, in one mode, a user may wish to achieve a certain performance aspect which will provide for reduced power losses internal to the energy storage 30 (in this example, a battery), thereby extending the useable lifetime of the battery. In this mode, for example, the power system 16 may be configured to provide a relatively low voltage. In another mode, the user may wish to achieve a certain performance aspect leading to increased output power to improve the efficiency of communication to a remote location. In this mode, for example, the power system 16 may be configured to provide a relatively higher voltage. In certain modes, the power system 16 may be configured to provide a substantially higher voltage. Other performance aspects may include, by way of example, maximum output current or average output current, or any other aspect deemed appropriate. Other modes may be desired. Any number of modes may be made available.

Various methods of selecting modes may be implemented. For instance, a user may configure the power system 16 on the surface by programming the power system 16 (such as by programming the electronics management system (EMS) 91 over the external communications bus (ECB) 97. The user may remotely configure the power system 16 by communicating over a data link such as an EM link or a mud pulse link or a link created by controlling a flow of downhole fluid or any other link. The power system 16 may be programmed to reconfigure itself in run-time. Distinct modes of operation may be achieved any number of ways. For instance, the electronics management system (EMS) 91 may change a setpoint for the output voltage or output current of a feedback regulated power converter in run-time, thus changing the nominal output voltage or current presented by the converter. The electronics management system (EMS) 91 may achieve this by applying, for example, analog or digital control signals to a respective supervisor 92, or by activating a device that changes control inputs, or by any other means deemed appropriate. In a converter designed with digital feedback control, the change among modes may be made digitally. In some cases, other circuit parameters may be effectively changed when changing among modes. For instance, passive components dictating stability of feedback loops may be changed when a nominal output voltage is changed. Those components may be actively switched out and other components switched in as needed using transistors or other controlled switching devices. In the case of digital feedback control, stability of feedback loops may be maintained by switching among different segments of code pre-programmed a digital controller.

Another exemplary feature of the power system 16 is that of low temperature control. Low temperature control may be desired in certain environments. That is, performance of the an energy source (e.g., the external power supply 51) may deteriorate temporarily below certain temperature ranges (a "low temperature threshold", which may be an approximate value, or range of values). Below the low temperature threshold, the energy source may be damaged if substantial power is drawn therefrom. Consider, for instance, a downhole battery available from Electrochem Solutions of Clarence, N.Y. (USA part number 33-127-150MR SERIES: 4422 DD with a size rated for 200 mA of output current down to minus 40 degrees Celsius, the "low temperature threshold"). Below the low temperature threshold, this battery may only be capable of supplying about 1-50 mA without causing permanent cell damage.

Thus, the power system 16 may be configured with a low-temperature control circuit. The low-temperature control circuit is configured to detect temperatures in the low temperature range and then to limit the power drawn from the energy source appropriately. Power drawn below the low temperature threshold may be allotted to certain functions, such as to maintain operation of the power system 16 as well as a control system for detection of temperature and control of the power draw. Thus, in some embodiments, a power limit setpoint is set above a power level needed to implement low temperature sensing and control. When an ambient temperature for the environment rises above the low temperature threshold, the low-temperature control circuit may then progressively restore power to selected components within the power system 16.

The power system 16 may be equipped to monitor temperature with a variety of devices. In some embodiments, the low-temperature control circuit is equipped with at least one of a thermocouple, a bandgap reference circuit and a resistance temperature detector (RTD). Other techniques for measuring may be employed, and may include, for example, use of other components within the power system 16 that exhibit temperature dependence characteristics.

Power draw may be limited by simply disabling certain power system components, for instance power converters and sensor systems. Power draw may also be limited by controlling the power draw of power system components for instance by regulating the output current or voltage from a power converter circuit. The system may be configured to resume normal operation once temperatures rise above the low temperature range.

While discussed in terms of low-temperature protection, it should also be recognized that aspects of the foregoing may be useful in providing high-temperature protections as well. While temperature protection provides for reduced functionality of the power system 16, in some instances, it is beneficial to induce an "over temperature shutdown mode" where the power system 16 is virtually shut down.

Another feature of the power system 16 is a "sleep mode." A sleep mode may provide users with protection of the power system 16. Such protection may be beneficial for periods where the power system 16 is not in use. For example, for periods of storage or transport where it is desired to maintain the power system 16 connected to the energy storage 30. Among other things, sleep mode will limit premature depletion of the energy storage 30. More specifically, a certain level of "standby power" will normally be required to keep components of the power system 16 active. If a given power system 16 is connected to the energy storage 30 and left in storage or in transport for several weeks to months, it is possible that the energy storage 30 would be substantially or completely depleted. Consider the following example.

In one example, the energy storage 30 includes a battery pack that has four cells (for example, part number 33-127-150MR SERIES: 4422 available from Electrochem Solutions of Clarence, N.Y.). The battery pack has a capacity of approximately 4 cells×3.67 V×29 Ah=425 Wh. A standby power of 200 mW drawn by a power system connected to such a battery pack for four weeks will deplete the battery pack approximately 67 Wh or approximately 16% of the total capacity. If the power system 16 is sent into storage with less than a full charge, or for an extended period of time, the impact could be significant.

In some embodiments, the sleep mode is activated by detecting an effective state of non-operation. Several methods may be employed. In one example, the power system 16 is provided with at least one dustcap. A respective one of the dustcaps is equipped to electrically couple with the power system 16. For example, the dustcap may include a jumper that is configured to connect to pins in a connector of the power system 16. The EMS 91 will recognize when certain pins in the connector have been connected and command the sleep mode.

In one embodiment, detection of the connection calls for making the pins (in this example, two pins) that are connected by the dustcap correspond to pins on the EMS 91. The EMS 91 is configured to recognize a first one of the pins as a digital output and the other pin as a digital input. The pin configured as a digital output may be set to a logic level for high, for instance, 5 V. Then, if 5 V is detected on the pin configured as an input, the EMS 91 will interpret that as an indication of a dustcap and thus a state of non-operation. Several combinations of pin configurations may be used to detect multiple states or to detect equivalent states caused by multiple distinct cases. Other methods of detecting a connection between pins may be used.

A dustcap (any type of cover, shield or packaging (all of which are referred to as a "cover" for convenience) may be used) may also be configured to impose other conditions on the power system 16. For instance, the cover may present a certain electrical resistance across pins or any other type of impedance, it may present a voltage for instance from a primary battery embedded in the dustcap, it may present an ac signal or a digital signal created by a separate circuit or any other means, it may present a nonlinear effect such as that provided by a diode. A connection to pins on a connector may require a rotatable connector embedded in the cover as a dustcap is normally screwed onto a pressure barrel. Thus a connection may mate with a receptacle and an outer portion of a dustcap may rotate about said connection. A connection may be implemented without a dustcap, it may be placed explicitly to put the system in sleep mode, it may be connected to a power system at a connector other than the one present on the outside of a pressure barrel. A sleep mode may be implemented by detection of non operation without an external connection to indicate non operation. For instance, a power system 16 may measure current delivered to a load and after some time of delivered current less than a prescribed value, determine a state of non operation and control a power system to enter a sleep mode. A power system may measure voltage on a capacitor or other energy storage element and determine that after some time of voltage deviation less than a prescribed amount determine a state of non operation and control the power system 16 to enter the sleep mode. Other methods may be employed as deemed appropriate or useful by the designer.

In some embodiments, the cover includes a component, such as at least one of a resistor, a battery, a diode and the like. That is, the cover may include any component that will provide a unique electrical signal to the power system 16, when the cover is installed. When the power system 16 detects an associated unique electrical signal, the power system 16 will enter the sleep mode.

The sleep mode may consist of disabling or powering down unnecessary system components such as power converter or sensor components required only during operation. It may also change a system parameter such as output voltage temporarily to for instance reduce standby power consumed in the self discharge of energy storage or in other resistive elements.

Another feature that may be included in embodiments of the power supply 16 enables data logging. That is, a memory logging circuit (i.e., module) may be included in the power system 16. The memory logging circuit may include memory and an interface to receive event data. This data may be useful for controlling system operation, sending system status to a remote location, or debugging or assessment of the system after operation among other uses. Some examples of data that the system may record include battery voltages, battery currents, battery states of charge, temperature, vibration, shock events, logic level signals indicating measured fluid flow, mud pulse actuation for an MWD mud pulser, battery changeover state, etc. The memory logging circuit may further include processing capabilities (i.e., a memory logging processor) as appropriate to receive and store the event data. The memory logging processor may also retrieve event data from memory and communicate the event data for transmission to the user.

Generally, a rate of data sampling and data parameterization is to be carefully selected to ensure storing of a useful amount of information. That is, memory rated for operating at high temperatures is generally less dense than memory rated for operating at lower temperatures. Accordingly, in some embodiments, data sampling and logging are performed at rates that are commensurate with a rate of change. In some embodiments, sampled data is parameterized (i.e., used to update fitting variable representing an aggregate parameter, such as a state of charge or damage fraction). Some examples are provided. For instance, in some embodiments, slow changing signals are only sampled every few minutes. Vibration data is parameterized as a time-average of rms acceleration measured from an accelerometer over a specified time window (e.g. 10 seconds). Battery state of charge is stored as a single data point that is updated as battery current is measured over time (as opposed to keeping a full record of battery current). Shock events are time-stamped and recorded as single events during which acceleration exceeded a specified limit (e.g. 35 Gs). A combination of volatile and non-volatile memory may also mitigate the scarcity of high density memory operating at high temperatures. That is, non-volatile memory (memory that retains its state despite loss of power), is generally less dense but will not lose its data in the event of a fault in an energy source, thus it is beneficial to retain data in non-volatile memory especially in hostile environment applications. Meanwhile volatile memory is generally more dense, but will not necessarily retain its data in the event of a fault in an energy source. In some embodiments, a compromise design is used that generally stores all data in volatile memory, so that a longer record may be had, while periodically archiving data to non-volatile memory.

By way of example, in the compromise design for memory management, the user may have access to a recent 100 hours or so of data record in the event of a fault in an energy source. The most recent data since the latest archive may be lost. This effect may be mitigated by archiving more often. However, non-volatile memory is generally rated for a specified number of write cycles. Thus, a tradeoff may be made. For example, if the system needs to last 2,000 hours and a ROM (non-volatile memory) is rated for 10,000 write cycles, we might archive data every 2,000 hours/10,000 cycles×60 minutes=12 minutes. Thus, the user may lose in a worst case 12 minutes of the most recent data, and statistically will expect to lose 6 minutes of the most recent data. This effect may be further mitigated by adding several ROMs to the power system 16 so that one ROM may be written for a number of time (for example, 10,000 times) and then regarded to be at end of life, then a second ROM may be written to 10,000 times and so on, such that more than 10,000 write cycles are available to the power system 16 and archiving can take place more frequently. Meanwhile, if there is no fault in an energy source, a full record of data may be available in the RAM (volatile memory). Accordingly, it should be recognized that a variety of memory management schemes may be employed.

An exemplary memory component is a one megabit high temperature ROM (EEPROM) is available from TT semiconductor Anaheim, Calif. USA (part number TT28HT010). This exemplary component is rated for operation up to about 200 degrees Celsius. Another example is available from the same manufacturer and is a 16 Mbyte RAM (SRAM), (part number TTS2MWV8) is rated for operation up to about 220 degrees Celsius.

As discussed above, one of the features that may be included in embodiments of the power system 16 is the bypass feature. Some additional aspects of the bypass feature are now discussed.

In some embodiments, the bypass feature is implemented with at least one of a separate and a redundant power converter (referred to as a "bypass converter"). In that case, it may be desirable to block current flow into or out of the output of components that are bypassed. Thus, a switch network may be included in the power system 16. In some embodiments, the switch network includes a diode with the output of a first converter so that the diode will block current flow appropriately. In some embodiments, the diode will not be appropriate (such as where the diode causes excessive power loss or blocking of current flow in a bi-directional design), so a MOSFET or other active device may be employed. In embodiments making use of at least one MOSFET or at least one other type of transistor as the switch, the switch device is coupled to an appropriate gate or base or other drive circuit to safely activate the switch device. In the case of a MOSFET, the inherent body diode should be considered to block current flow in both directions. A series diode opposing the direction of the body diode may be employed to block current in both directions. Combinations of MOSFETS may also be employed. Combinations of MOSFETs and diodes may be employed as well. In some topologies, functionality of the switch network may be inherent to the circuit and so an additional switch network is not needed. For instance, in a boost converter having an asynchronous high side switch (a diode), the converter will only conduct substantial current from the source to the load in the high potential path. Thus, if the functionality required of the switch network is that current cannot flow from the load to the source in the high potential path, then no additional switch network is needed.

The bypass feature may be particularly useful when a component of the power system 16 is not in a state that is suitable for providing power. For instance, the bypass feature may be useful when a subsystem or the energy storage 30 has failed. The bypass feature may also be useful when the energy storage is in a low state of charge or when the power system 16 has entered a mode of operation that prohibits it from utilizing the energy storage 30 or another system component. Other uses of the bypass feature may present as the designer finds them appropriate.

Figure 18A:
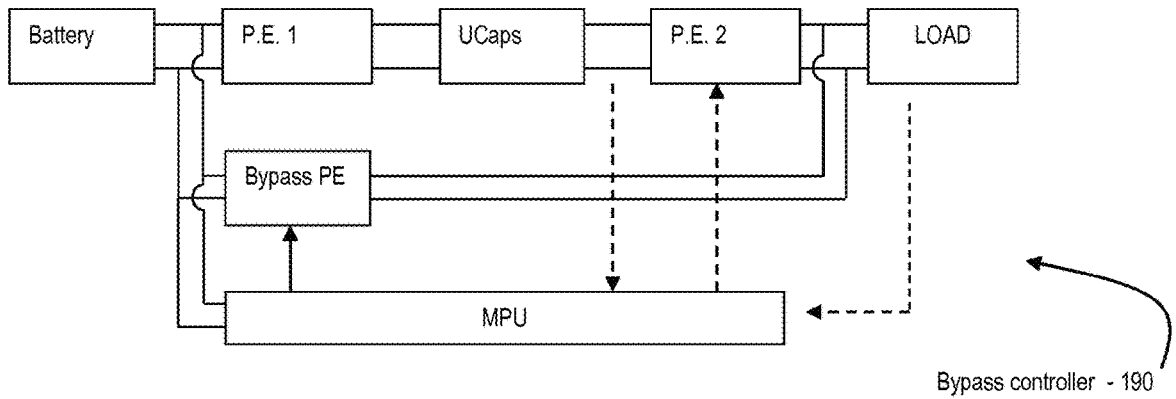
FIGS. 18A, 18B and 18C, collectively referred to herein as FIG. 18, are block diagrams depicting embodiments of a bypass controller.
Figure 18B:
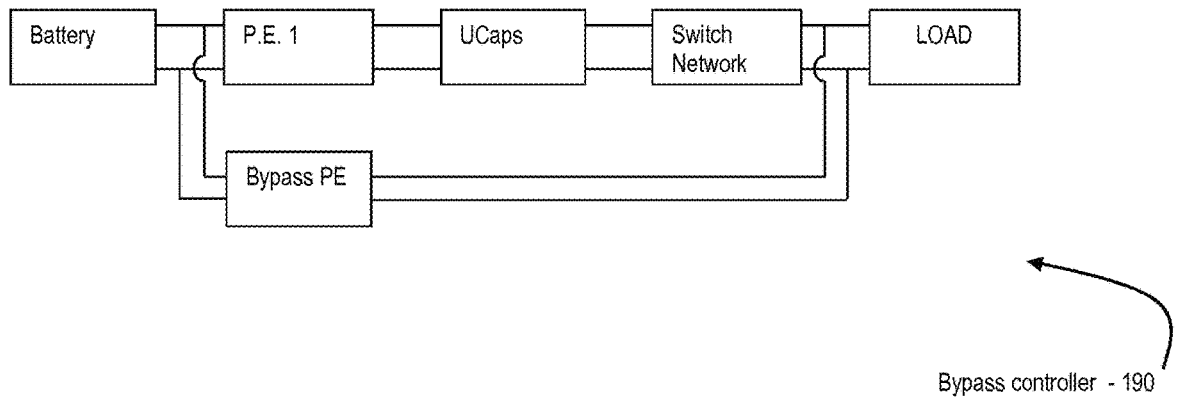
Figure 18C:
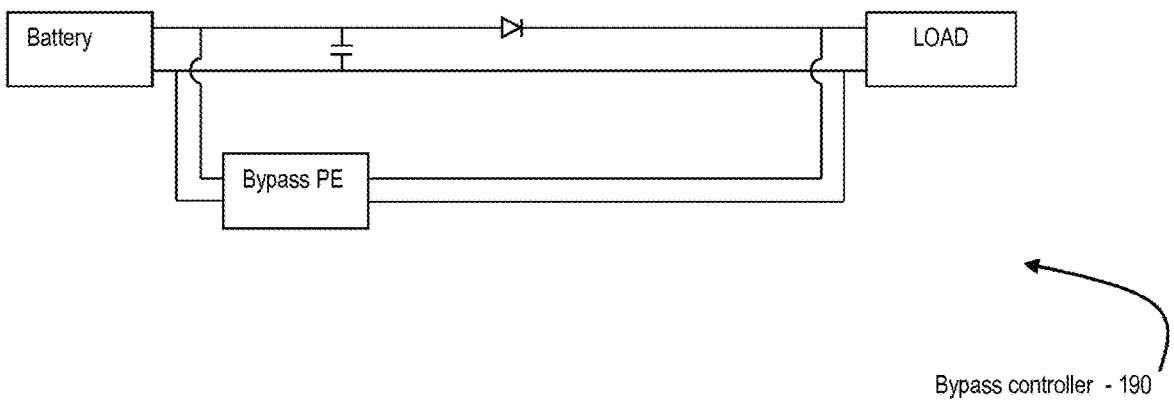

Some embodiments of a bypass controller are depicted in FIG. 18. In FIGS. 18A, 18B and 18C, a bypass controller 190 is depicted in various relations to components of the power system 16.

Yest another feature that may be included in the power system 16 is an optimization module. In embodiments include an optimization feature, the power system 16 may adjust operation to optimize an overall performance aspect. This adjustment may occur in run time. For instance, the power system 16 may target an optimized overall system energy efficiency. The power system 16 may be configured to consider the sum of all power losses. For example, the power system 16 may be configured to monitor losses in the load as the losses vary with load voltage, losses in the energy source as they vary with rms current levels, standby power losses in keeping a power converter controller active, leakage power losses in the energy source and the like. Using this information, the optimization feature is tasked with reducing overall power loss.

In order to provide for optimization, the optimization module may employ any one or more of a variety of techniques. For example, the optimization module may compute optimal parameters such as those that adjust rms current draw from the energy source, relative on-time of a power converter control circuit, output voltage presented to a load, voltage presented to the energy storage 30 and the like. The optimization circuit may also employ a "perturb and observe" method, by perturbing one parameter and re-measuring system efficiency, then attempting to adjust the perturbations in a direction that decreases total power loss. An optimum or a local optimum may be identified when perturbations in either direction result in an increase in measured power loss. Avoidance of local optima that are substantially suboptimal in a global sense may be aided by combining the perturb and observe seeking algorithm with a first computation. The first computation should locate the set of system parameters relatively near to the the global (system) optimum. It may attempt to do so by first considering an estimated sum of all losses in the power system 16. The sum may include loss terms derived from run-time measurements, loss terms derived from a-priori or pre-programmed values, loss terms derived from computation, and loss terms derived from a combination of the above. The first computation may attempt to locate a global optimum by computing the sum for various sets of system parameters and choosing the set of system parameters yielding the minimum computed power loss among all sets of system parameters. The first computation may also attempt to compute a derivative of the sum to locate a set of local optima and then back substitute the system parameters into the original sum expression to arrive at a set of local optima in order to choose the global optimum.

Further, the optimization module may adjust optimization in run-time as system parameters change, for instance as time-average load current or power changes, as the energy storage 30 ages, as temperature increases and leakage current of the energy storage 30 increases, etc. The power system 16 may be aided to that end by the ability to measure voltages and currents for instance, source voltages and currents, load voltages and currents, its own standby currents, currents flowing into the energy storage 30, etc. The optimization module may further combine measurements to determine other aspects such as battery internal resistance as it may be derived from two distinct pairs of measurements of battery voltage and current. An internal resistance of the energy source may be taken as an input to an optimization.

In some cases, an optimized output voltage leads to higher efficiency (less loss) in some embodiments of the power system 16. Consider the following example. In an MWD mud pulser system, a lower voltage may produce sufficient motor actuation with less dissipation. Normally, a high voltage battery is needed to drive an MWD pulser because instantaneous voltage drops during pulses of output power and the lower operating voltage limit of the MWD system must be accounted for when choosing the battery voltage. That is, some head room must be included in the battery voltage to account for droops resulting from its internal resistance. Otherwise, those droops may breach a lower limit voltage threshold that could cause shutdown of the power system 16 of other unwanted behavior. However, such a battery voltage may not be optimal for mud pulser efficiency and thus battery life. Accordingly, the power system 16 may be configured to buffer the battery voltage and present power to the MWD pulser. In this case, the power system 16 may provide a substantially more fixed output voltage compared to a battery as a result of feedback regulation and or low output series resistance of the energy storage 30, a power converter or both. Thus the consideration for head room that is typical with a battery-only design is significantly relaxed. A lower voltage may be presented to the MWD pulser without concern for breaching a lower limit voltage threshold. Meanwhile, the MWD pulser operating under a lower voltage may be more efficient. Ultimately, this efficiency leads to longer life of a battery in the energy storage 30 because there is less battery energy wasted in inefficiency. In one example, an MWD mud pulser may accept voltages from 15 to 29 V. A 7 or 8-cell battery is normally chosen to achieve voltages of approximately 25 to 28 V. During operation and as the battery degrades over its lifetime leading to an increase internal resistance, instantaneous voltages may drop from the open-circuit battery voltage down to 20 V or less during pulsed power delivery to the MWD pulser. Once the battery voltage reaches a lower threshold measured in either an instantaneous fashion or a time-averaged fashion or otherwise, a system may cease to function properly or may intentionally shut down. Meanwhile an MWD pulse driven from a 28 V battery may consume approximately 15 J of energy. Instead, the power system 16 may be coupled to the battery and the MWD pulser. The power system 16 may provide a relatively fixed 20 V to the MWD pulser over the life of the battery. Meanwhile an MWD pulse driven by a 20 V power system output may consume approximately 11 J of energy representing an approximately 26% energy savings. An example of an MWD pulser system that exhibits this behavior is a Benchtree MWD motor drive mud pulser (part number 900370) available from Benchtree, Georgetown Tex. USA.

A system health monitor may be provided as yet another feature. A system health may be derived from measurements and records of temperature, vibration and shock and corresponding durations. A damage fraction may be pre-defined based on empirical and statistical tests.

The power supply 16 may include redundant features in the architecture thereof. For instance, additional power electronics circuits may be included. Additional capacity in the energy storage 30 may be included. The power system 16 may be configured to deactivate a component upon detection of a fault in that component and to then activate a redundant component. A circuit may be deactivated by at least one of disabling control circuits, breaking power connections to it, and disconnecting it from inputs and outputs using active devices such as transistors or relays. Energy storage 30 may likewise be deactivated by disconnecting it from inputs and outputs using active devices.

A fault may by identified in any number of ways and will depend on the type of fault to be identified and the type of component that may have failed. For instance a power converter fault may be indicated by an inability of the converter to maintain an output voltage within typical limits for longer than a specified amount of time so long as the output power draw is within typical limits. An ultracapacitor fault may be identified as a low or nearly zero voltage despite normal voltages present on series connected ultracapacitors. This may specifically indicate a short circuit type fault. Fault detection may be aided by employing voltage measurement devices such as resistor dividers coupled to analog to digital converters further coupled to the PEMS 91 or other type of controller. Faults and damage fractions may be recorded in memory (such as by techniques provided herein) and, among other things, reported to the user.

Having thus described aspects of electrical performance of the power system 16, some additional aspects are now provided. In general, these additional aspects relate to construction and fabrication of the power system 16.

Figure 19:
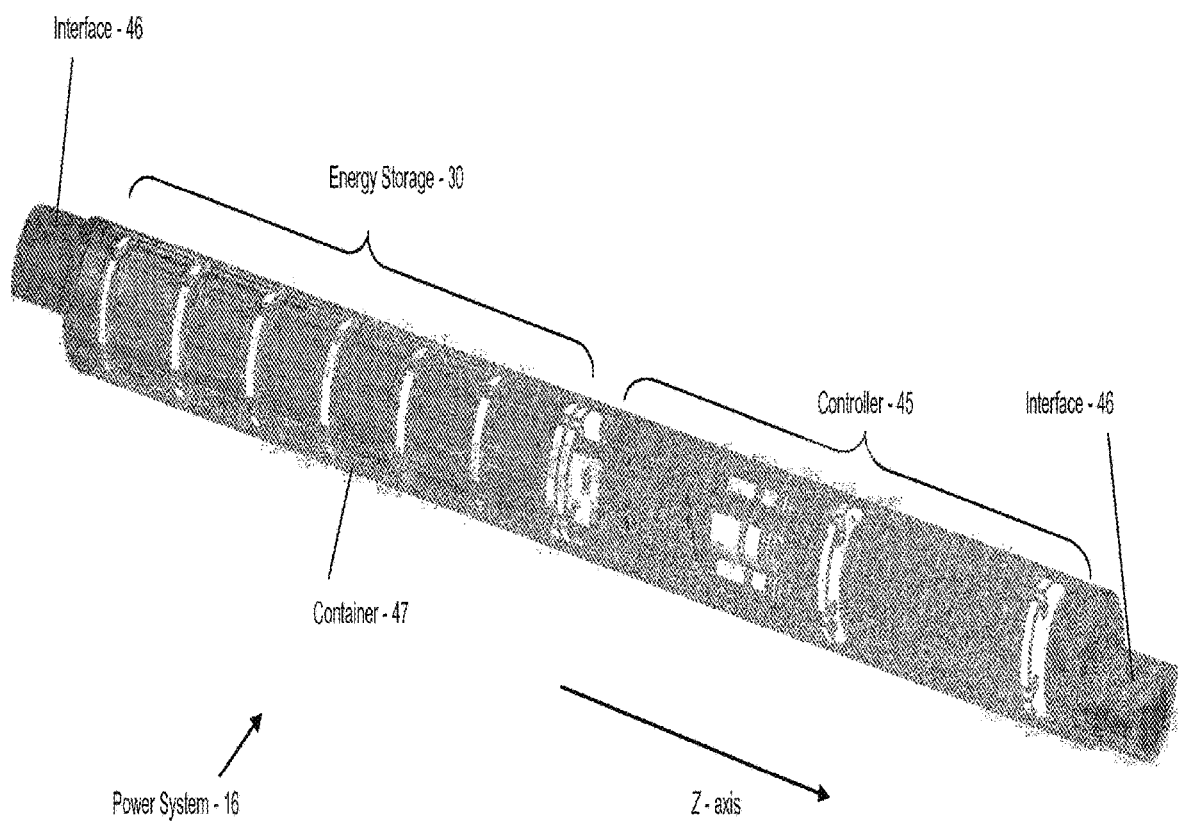
FIG. 19 is a perspective view of an exemplary power supply.
Figure 20:
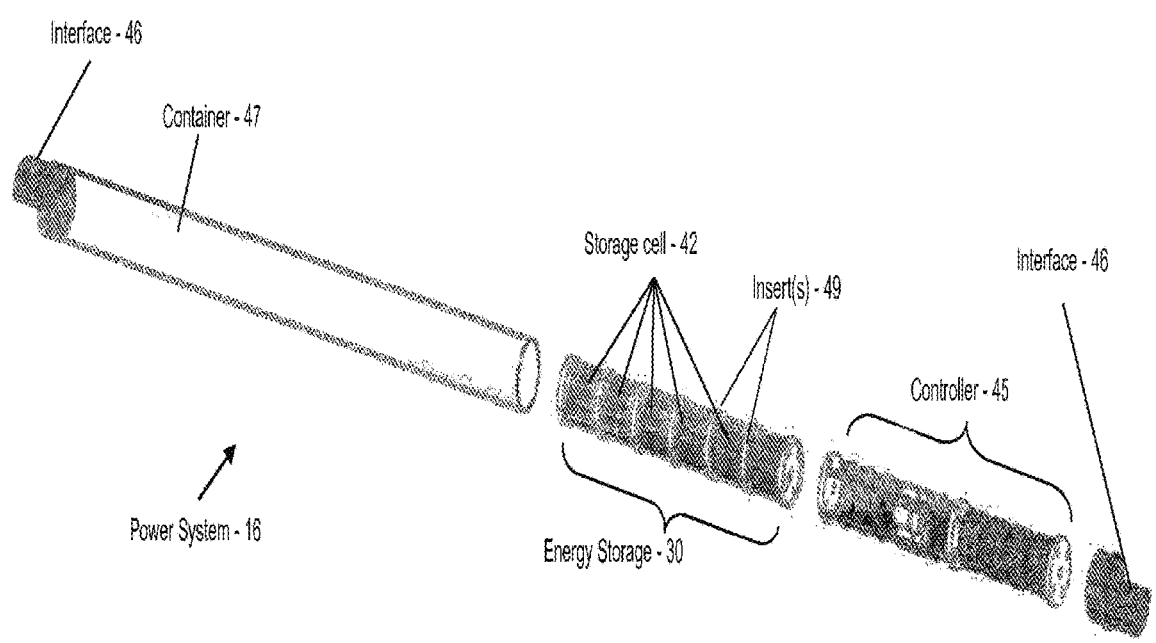
FIG. 20 is an exploded view of the power supply of FIG. 19.

Referring now to FIGS. 19 through 24, further aspects of the power system 16 are shown. In FIG. 19, an embodiment of the power system 16 suited for incorporation into the logging instrument 10 is shown. In this example, the power system 16 has a form factor that simplifies incorporation into a drill string 11 or a wireline 8. More specifically, in this example, the power system 16 is provided as an elongated, cylindrical container 47 and includes an interface 46 (in this embodiment) at each end. Within the container 47 is a plurality of ultracapacitors as the energy storage 30. Charging and discharging of the energy storage 30 may be controlled by controller 45, which communicates power through the interface 46. FIG. 20 provides an exploded view of the embodiment of the power system 16 depicted in FIG. 19.

The power system 16 and the components thereof may be assembled in a "modular" fashion. That is, modular architecture of the power system 16 provides for customizing each power system 16 and providing more expedient fabrication. Aspects of modular construction will become more apparent when considering aspects introduced below.

Figure 21:
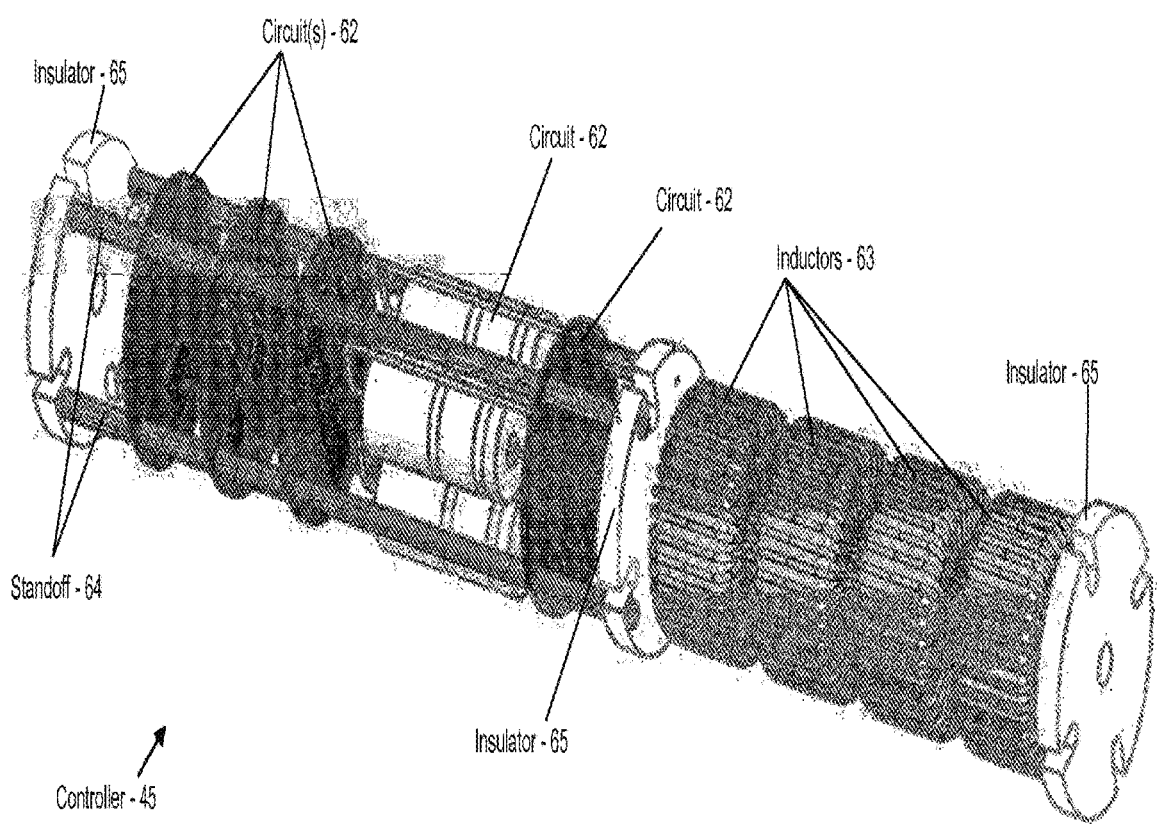
FIG. 21 is a perspective view of a controller for the power supply illustrated in FIGS. 19 and 20.

Referring to FIG. 21, there is shown an embodiment of the controller 45. In this example, the controller 45 exhibits a form factor suited for disposition within the cylindrical container 47. Accordingly, the controller 45 may include at least one insulator 65. In this example, the controller 45 is generally bounded by an insulator 65 disposed at each end, and further includes an intermediate insulator 65. Each of the insulators 65 generally provides physical separation of the controller 45 from other portions of the power system 16, and may be used for incorporation of other features such as an anchor for a plurality of standoff supports 64. The insulators 65 may be fabricated from any suitably insulative material, such as polytetrafluoroethylene (PTFE) or an equivalent. The insulators 65 may be tightly fit within the container 47, such that intermediate components are physically held into place within the container 47. Generally, each of the insulators 65 may include at least one physical feature, such as at least one notch or hole, to provide at least one access-way. The at least one access-way may provide access for, by way of example, passage of wires, encapsulation and the like.

The standoff supports 64 collectively provide for mounting and separation of a plurality of circuits 62. The circuits 62 may include components disposed, for example, on a circuit board. The circuits 62 may include components such as, for example, a plurality of capacitors. In some embodiments, at least one inductor 63 is included. In some embodiments, a plurality of inductors 66 is included. The plurality of inductors 63 may be wound with a single conductor. The single conductor may be used in some embodiments, to provide the plurality of inductors 63 with robust physical strength in harsh environments (such as where excessive vibration will be encountered).

Generally, the standoff supports 64 provide a rigid support maintaining spacing between each circuit 62. Each of the standoff supports 64 may be fabricated from materials as appropriate, such as metallic materials and/or insulative materials, such as forms of polymers.

In the illustration of FIG. 21, each of the circuit boards is generally disposed perpendicular to the Z-axis when in service. Thus, each of the circuits 62 generally absorbs and distributes stress evenly across the circuit 62, and experiences minimal perturbation from any mechanical stress. In short, each of the circuits 62 may include a design that provides for minimizing at least one of stress and strain experienced (i.e., axial forces are compressive rather than sheer). Generally, each of the circuits 62 may include features, such as at least one notch or hole, to provide at least one access-way. The at least one access-way may provide access for, by way of example, passage of wires, encapsulation and the like. A form factor (i.e., a physical appearance) of each circuit 62 may be adapted in any way desired to provide for such accommodations. For example, instead of a circular circuit board, the circuit board may have two to many sides (n-gonal).

At least two of the storage cells 42 may include at least one insulator 65 disposed there-between. Each one of the storage cells 42 may include other forms of insulative materials, such as, for example, a polyimide film such as KAPTON, provided by Dupont Chemical Corp. of Delaware. Generally, KAPTON is used as it remains stable in a wide range of temperatures. Each of the storage cells 42 may be wrapped in the insulative film, which among other things, may be used to provide for prevention of electrical shorting.

Once the various modular components have been assembled (i.e., interconnected), these are installed within the container 47. For example, the assembly may be inserted into the container 47. In order to ensure a mechanically robust power system 16, as well as for prevention of electrical interference and the like, in some embodiments, encapsulant may be poured into the container 47. Generally, the encapsulant fills all void spaces within the container 47.

Embodiments of the encapsulant may include, for example, SYLGARD 170 (available from Dow Corning of Midland Mich.), which is a fast cure silicone elastomer that exhibits a low viscosity prior to curing, a dielectric constant at 100 kHz of 2.9, a dielectric strength of 530 volts per mil v/mil, and a dissipation factor at 100 Hz of 0.005, and a temperature range of about minus forty five degrees Celsius to about two hundred degrees Celsius. Other encapsulants may be used. An encapsulant may be selected, for example, according to electrical properties, temperature range, viscosity, hardness, and the like.

In general, each of the circuits 62 may represent at least one value added feature for a user (such as some of the foregoing features, including for example those features described as options in the options module 99), and may be included in the power system 16 as needed. As a matter of convention, a "value added feature" may be considered as a feature that is useful in controlling the power system 16. For example, a value added feature may include capabilities for data logging, telemetry, a state-of-charge monitor, battery change over control, power conversion, a digital supervisor, at least one interface (such as a serial interface), a health monitor and the like.

Accordingly, there may be a common electrical bus for connecting of the various circuits 62. The electrical bus may include wired assemblies (such as a bus that includes a plurality of conductors soldered or otherwise connected between the circuits 62). The electrical bus may include other technologies as well.

That is, the electrical bus may include other forms of connections in place of or in addition to wired assembly. For example, the bus may include at least one bus connector. The bus connector may include, for example, a mateable male component and a mateable female component, where each component may be attached to a respective one of the circuits 62. In these embodiments, the bus connector may additionally provide for some degree of physical support within the controller 45. The bus connector may include one to many conductors, and may be selected for, among other things, acceptable temperature range of operation, mechanical properties (such as rigidity). Each of the mateable male component and the mateable female component may be pre-fabricated onto a respective one of the circuits 62, or later added to the respective circuit 62 as the various circuits to be used in the power system 16 are identified. A variety of bus connectors may be used. See, for example, FIG. 22.

Figure 22:
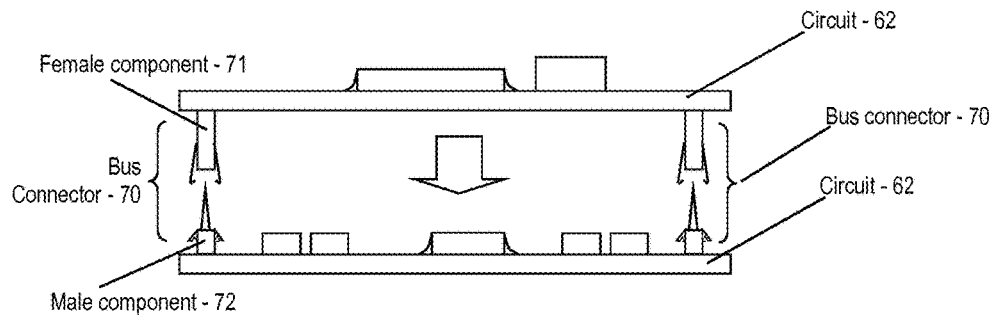
FIG. 22 is a side view of circuits that are assembled using bus connectors.

In FIG. 22, a simplified view of a bus connector 70 is shown. In this example, a female component 71 includes a latching device for latching with a male component 72. When assembled, the female component 71 and the male component 72 provide for electrical communication as well as structural support between the two circuits 62. Additional bus connectors 70 may be used. For example, another bus connector 70 may be disposed at an opposite side of the circuits 62 to provide for increased structural strength.

The bus connector 70 may be surface mounted, may be mounted in at least one through-hole, mounted in series (or parallel), or in any manner deemed appropriate. In some embodiments, the bus connector 70 is adapted for incorporation of an intermediate device, such as a ribbon cable (not shown). The ribbon cable may include, for example, polyimide flexible material suited for high temperature operation.

Figure 23:
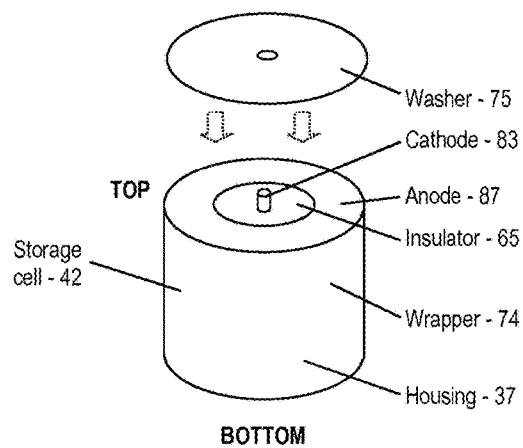
FIG. 23 is an isometric view of a storage cell.

As depicted in FIG. 20, the energy storage 30 may include a plurality of storage cells 42. The storage cells 42 may be electrically coupled in a variety of configurations. Reference may be had to FIGS. 23 and 24 for more detail on the construction of the energy storage 30 from a plurality of singular storage cells 42.

Referring to FIG. 23, the storage cell 42 includes a cathode 83 disposed at a top. The housing 37 of the storage cell 42 provides an anode 87. The cathode 83 and the anode 87 are electrically separated by an integrated insulator 63. For example, the cathode 83 may be an electrode included in a glass-to-metal seal incorporated into the housing 37. In order to protect the storage cell 42 from unwanted electrical interference, the housing 37 may be wrapped in a wrapper 74 of an insulative material, such as a film of the KAPTON discussed above. The KAPTON may include a high temperature adhesive disposed thereon to ensure adherence to the housing 37. Generally, in some embodiments, the wrapper 74 provides electrical insulation over the entire housing 37, with exceptions for the cathode 83 and a bottom surface of the housing 37.

In some embodiments, the cathode 83 is fabricated from stainless steel, however, this is not a requirement.

In some embodiments, a washer 75 may be disposed over the wrapper 74. The washer 75 may be fabricated from similar materials as the wrapper 74 (e.g., from a KAPTON film). In general, the washer 75 is dimensioned so as to fit snugly around the cathode 83 and to provide coverage of the entire top of the housing 37. Subsequent to placement of the washer 75, a tab may be affixed to the cathode 83.

Among other things, the washer 75 provides for additional electrical insulation in the energy storage 30. Of course, while the washer 75 may be placed about the cathode 83 (as shown and described), the washer 75 may be placed about the anode 87 (for example, consider the assembly of FIG. 23 with reversed polarity). Accordingly, the washer 75 may be placed about at least one electrode (i.e., anode and/or cathode) as deemed appropriate.

Figure 24A:
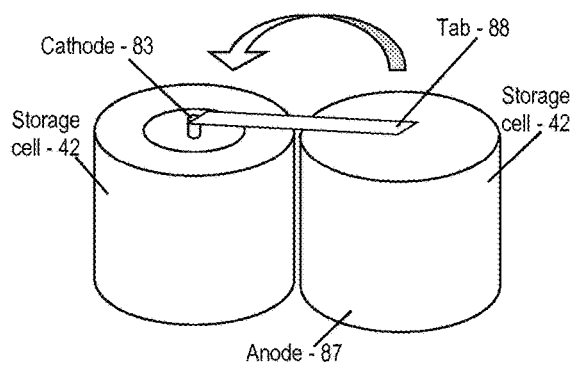
FIGS. 24A and 24B, collectively referred to herein as FIG. 24, are isometric views of two of the storage cells of FIG. 23 in stages of assembly into the energy storage
Figure 24B:
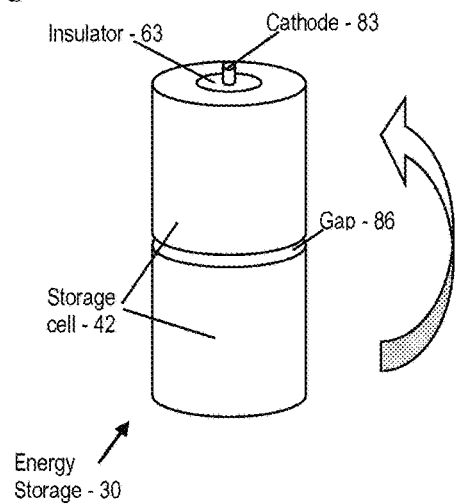

Referring now to FIGS. 24A and 24B, collectively referred to herein as FIG. 24, aspects of assembly of the energy storage 30 are shown. In FIG. 24A, two storage cells 42 are placed side-by-side. A tab 88 is affixed to the cathode 83 of a first one of the energy storage cells 42, and also affixed to the bottom surface of a second one of the energy storage cells 42. Once the tab 88 is suitably affixed (such as by laser, spot, tig, resistance, ultrasonic or other form of welding) the second one of the energy storage cells is rotated into an upright position, as depicted in FIG. 24B.

In one embodiment, nickel is used to fabricate the tab 88. However, material used for the tab 88 may include any material deemed to exhibit suitable properties (such as weldability, strength, conductivity and the like).

Series connection of the storage cells 12 is one exemplary aspect of the energy storage 30. In other embodiments, the energy storage 30 may include storage cells 12 that are connected in parallel, or in some combination of series and parallel.

When a plurality of storage cells 42 are assembled into a stack (i.e., in series), as shown in FIG. 24B, a gap 86 is realized between each of the storage cells 42. An insert (shown in FIG. 20), may be disposed between each of the storage cells 42. In some embodiments, the insert 49 is fabricated from a high-temperature insulative material, such as, for example, polytetrafluoroethylene (PTFE). The insert 49 provides for, among other things, distribution of mechanical forces, and ensures electrical separation of respective anodes 87 during operation.

Once the energy storage 30 is assembled in a final form, then the power system 16 may be "potted." That is, once the power system 16 is inserted into the container 47, the container 47 may be filled with encapsulant. Among other things, the encapsulant provides for damping of mechanical shock as well as protection from electrical and environmental interferences within the power system 16. In one embodiment, the power system 16 was filled with SYLGARD® 170 silicone elastomer (available from Dow Corning of Midland, Mich.) as the encapsulant. The encapsulant may also provide for thermal conduction so as to dissipate excess heat away from, for instance, a circuit component.

Having thus described aspects of the power system 16, it should be recognized that a variety of embodiments may be realized. For example, the power system 16 may include circuits that provide a state of charge monitor for monitoring charge in at least one of the storage cells 42 or a battery coupled to the power system 16 (not shown); the power system 16 may include control circuitry for drawing power from one or more of several battery packs arranged, for example, in a redundant configuration; the power system 16 may provide for a motor drive; may include various sensors, such as pressure, temperature and vibration (which may be employed to cancel the effect of very wide temperature variations on set points in feedback regulation circuits. Temperature coefficient strategic component selections mitigate these problems as well, for instance CGO or NPO dielectric ceramic capacitors have a relatively flat response to temperature across this range. Active device performance variations can be significantly mitigated by use of silicon-on-insulator (SOI) and silicon carbide (SiC) technology widely available in both hermetic and bare die form.

Other high temperature materials, components and architectures as are known in the art may be employed to provide for operability at a specified (high) temperature.

Silicon-on-insulator (SOI), Silicon Carbide (SiC), bare die components, ceramic PCB's, low temperature coefficient passives and high temperature, hi-rel solders will all be sourced to complete the electronic systems. A non-exhaustive list of commercial suppliers for each of the above components is included in Table I below.

TABLE I

Exemplary High-Temperature Components Manufacturers

| Component | Vendor |
| --- | --- |
| SiC Bare Die Transistors | Micross Components, Los Angeles, CA USA |
| SiC Bare Die Schottky Diodes | Micross Components, CA USA |
| Si and SOI Bare Die linear and digital circuits | Minco Technology Labs LLC, Austin, TX USA |
| Ceramic Surface Mount CGO, NPO capacitors | Digikey, Minneapolis, MN USA |
| Ceramic Surface Mount Resistors | Digikey, Minneapolis, MN USA |
| Bare Die Magnetics | Minco Technology Labs LLC, Austin, TX USA |
| Ceramic Printed Circuit Board | Complete Hermetics, Santa Ana, CA USA |
| Terminals, Headers, Packages | HCC Ametek Ind., New Bedford, MA USA |
| AuGe Solder | Hi-Rel Alloys, Ontario CA | provide output to control circuitry for controlling the power system 16 as appropriate); and the like.

In general, the power system 16 disclosed herein is adapted for operation in the harsh environment encountered downhole. For example, the energy storage 30 and the power system 16 as a whole are, in some embodiments, adapted for operation in a temperature range from ambient temperatures up to about one hundred and seventy five degrees Celsius.

Some exemplary off-the-shelf components and techniques that may be used in the power system 16 include: (1) bare die silicon and silicon-on-insulator active devices, (2) silicon carbide active power devices, (3) high temperature rated and low temperature coefficient ceramic passives (COG or NPO dielectrics), and (4) high temperature magnetic passives. AlN (aluminum nitride) ceramics may be used as a circuit substrate material for excellent thermal stability and thermal conductivity. Circuit interconnects may be formed of oxidation resistant Au traces. Bonding strategies may employ flip chip or Au or Al wire bonding for bare die active components using, for instance, AuGe high temperature solder. In some embodiments, wire bonding is expected to be advantageous over flip chip bonding due to the added mechanical compliance, especially in the presence of thermal expansion and shock and vibration.

High temperature circuit techniques may be employed, for example, to ensure stability of feedback regulation circuits despite very wide temperature swings as passive circuit components used for frequency compensation may vary in value. Low or essentially zero temperature coefficient circuit designs can be achieved by coupling negative temperature coefficient resistors with conventional resistors, by closely matching active devices and by relying on ratiometric (relative) rather than absolute sensing and control. As an example, bandgap derived voltage references can As used herein, use of the term "control" with reference to the power system 16 generally relates to governing performance of the power system 16. However, in some embodiments, "control" may be construed to provide monitoring of performance of the power supply. The monitoring may be useful, for example, for otherwise controlling aspects of use of the power supply (e.g., withdrawing the power supply when a state-of-charge indicates useful charge has been expended). Accordingly, the terms "control," "controlling" and the like should be construed broadly and in a manner that would cover such additional interpretations as may be intended or otherwise indicated.

In general, use of certain measures and components (such as the use of the wrapper 74, the washer 75, the encapsulant and the like) may provide certain prophylactic benefits and ensure performance of the power system 16 in the harsh environment encountered downhole. Accordingly, while some of these measures and components may provide additional benefits, preparing the power system 16 for downhole operation by incorporation of these measures and components, where a prophylactic benefit is realized, may be, in at least some contexts, referred to as "hardening" of the power system 16.

Some of the advantages of the power system 16 provided herein include an increased level of safety provided by, for example, use of low or moderate rate batteries where high rate batteries used to be necessary. The energy storage 30 does not contain substantial quantities of lead or lithium. The power system 16 includes extension of useable battery life by limiting temporary voltage dips normally seen during high current draw. Further, the power supply adds flexibility with inherent power conversion so batteries may be more easily interfaced with tools and instruments downhole. In addition, the power system 16 may provide boost power while smoothing and limiting battery current draw using high-temperature rechargeable ultracapacitors. These effects will generally extend usable life of batteries included in the power system 16.

The power system 16 may also eliminate effects of voltage variations on a direct current (DC) bus that may otherwise lead to issues such as "cross-talk" or unwanted coupling across signal wires, by reducing large, fast voltage deviations from electrical circuits with in the power system 16.

Having presented many aspects of the power system 16 that includes a rechargeable energy storage 30, various performance parameters of an exemplary embodiment are provided in Table II.

TABLE II

Performance Parameters for an Exemplary Downhole Energy Supply

| Parameter | Symbol | Value |
| --- | --- | --- |
| Op. temperature range (approximate) | T | −40° C. to +250° C. |
| Max. Input Voltage | $V_{in, max}$ | +100 V |
| Min. Input Voltage | $V_{in, min}$ | +2.5 V |
| Const. Output Voltage | $V_{out}$ | Adjustable: +2.5 to +100 V |
| System Peak Power | $P_{pk}$ | 0.10 W to 10 MW |
| Max Output Current | $I_{max}$ | 100 mA to 400 A |
| System Energy | E | 0.01 J to 100 MJ |
| Number of Cells | N | 2 to 1,000 |
| Diameter | D | 1 cm to 30 cm |
| Length | L | 10 cm to 3 m |
| System Weight | W | 10 g to 30 kg |
| System Volume | V | 10 cc to 30 Liters |
| Leakage Current | I/L | <1,000 mA/L over T |

Note that in Table I, System peak power is calculated using the peak power of each cell, $V_w^2/(4R_{dc})$, multiplied by the number of cells in the system, N. The maximum output current is calculated by dividing peak power by a nominal system voltage 20 V. System energy is calculated using the per cell energy, ½ $CV_w^2/3{,}600$, multiplied by the number of cells in the system, N.

Key features resulting from embodiments of the exemplary system include operating temperatures up to about two hundred and fifty degrees Celsius, with survival temperatures above this; substantial use of non-toxic components; customizable current regulation and safety current limit; customizable output voltage setting; redundant electronics; automatic battery de-passivation; bypass operation to ensure fail-safe; and hermetic construction as well as others.

Accordingly, the system is highly deployable in applications such as downhole MWD and LWD including those where high power and pulsed power are needed. Among other things, in oil and gas or geothermal exploration ("downhole"), examples of benefits include: improved primary battery life downhole by reducing losses internal to a battery by coupling a power system to a primary battery and a load leading to "smoothed" battery current that creates less energy loss compared to "peaky" current due to the squared relationship between current and ohmic losses in the effective series resistance internal to the primary battery; an increase system burst power capability by coupling the power system to a relatively low power source (e.g., the external energy source 51) and a load, which results in an ability to provide bursts of relatively high power from an energy storage and to recharge the energy storage over a longer timeframe; an mitigation of intermittency in some power sources such as generators by coupling of the power system 16 to a relatively intermittent source and a load.

Thus, the teachings herein result in a downhole system that can boost power downhole and extend the hours of runtime from 20% to 40% or more over conventional systems. Further, this can enable the use of low rate or moderate rate batteries instead of high rate, while providing enhanced reliability through placement of fail safe and redundancy features to minimize the potential for failure downhole, which results in simplified surface operation.

It should be recognized that the teachings herein are merely illustrative and are not limiting of the invention. Further, one skilled in the art will recognize that additional components, configurations, arrangements and the like may be realized while remaining within the scope of this invention. For example, a user might wish to withdraw the energy storage 30 and have it remain topside in some evolutions, while supplying power to the logging instrument 10 via cabling, such as via the wireline 8. Generally, design and/or applications of the power system 16 in a downhole environment, or otherwise, are limited only by the needs of a system designer, manufacturer, operator and/or user and demands presented in any particular situation.

Further, various other components may be included and called upon for providing for aspects of the teachings herein. For example, an additional power supply (e.g., at least one of a generator, a wireline, a remote supply and a chemical battery), cooling component, heating component, pressure retaining component, insulation, actuator, sensor, electrodes, transmitter, receiver, transceiver, antenna, controller, electrical unit or electromechanical unit may be included in support of the various aspects discussed herein or in support of other functions beyond this disclosure.

In general, the power system 16 may include one to a plurality of types of power converters. Exemplary types of power converters include, without limitation, "buck," "boost," "buck-boost," "flyback," "forward," "switched capacitor," and other isolated versions of non-isolated converters (e.g., CU, buck-boost), as well as cascades of any such converters (e.g., buck+boost). The converters may also be DC-AC (inverters), AC-DC (rectifiers), AC-AC. Exemplary types of switched capacitor circuits include, without limitation, Marx type, ladder networks, series-parallel, charge pumps and the like. In general, converters may be switched mode or linear regulating types of converters. Switched mode converters may include, transistors, diodes, silicon controlled rectifiers, or any other type of switch that is deemed appropriate by the interested party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Where appropriate, technology may be presented herein as a "circuit," a "module," a "component," and by other similar (generally interchangeable) terms. It should be recognized that the form of the technology presented is not limited by the embodiments discussed herein. That is, it should be recognized that many aspects, such as circuitry, may be implemented as machine executable instructions stored in machine readable media (i.e., as software), and vice-versa. Accordingly, where appropriate, circuits may be included, or may be displaced by capable processors and the like (and vice-versa).

Where used herein, the term "automatic" and similar terms should be construed as the performance of a process or technique that generally proceeds, at least in part, unattended or without interaction, and may continue on an ongoing basis of a defined or undefined duration. For example, a control circuit or software may receive an input, and automatically make control adjustments. Adjustments and other processes, controls or techniques may be performed on a "real-time" or "substantially real-time" basis. However, terminology relating to "real-time" should be construed as performance of the particular process, control or technique within a period of time that is satisfactory to meet the needs of a user, designer, manufacturer or other similarly interested party, and is not intended to be limited to instantaneous response or performance.

In the present application a variety of variables are described, including but not limited to components (e.g. electrode materials, electrolytes, etc.), conditions (e.g., temperature, freedom from various impurities at various levels), and performance characteristics (e.g., post-cycling capacity as compared with initial capacity, low leakage current, etc.). It is to be understood that any combination of any of these variables can define an embodiment of the invention. E.g., the combination of a particular electrode material, with a particular electrolyte, under a particular temperature range and with impurity less than a particular amount, operating with post-cycling capacity and leakage current of particular values, where those variables are included as possibilities but the specific combination might not be expressly stated, is an embodiment of the invention. Other combinations of articles, components, conditions, and/or methods can also be specifically selected from among variables listed herein to define other embodiments, as would be apparent to those of ordinary skill in the art.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention but to be construed by the claims appended herein.

What is claimed is:

1. A power system adapted for supplying power in a high temperature environment, the power system comprising:
   a rechargeable energy storage that is operable in a temperature range of between about minus forty degrees Celsius and about two hundred and ten degrees Celsius coupled to a circuit for at least one of supplying power from the energy storage and charging the energy storage;
   wherein the rechargeable energy storage comprises:
   an energy storage;
   a power supply; where the power supply is configured to supply energy from an energy storage to a logging instrument;
   a first subsystem controller;
   a first subsystem that is operative to provide a current draw for battery depassivation; where the first subsystem controller is configured to control the first subsystem; and
   an automatic bypass; where the automatic bypass determines a failed state for a component of the power system and reroutes power from the energy storage around the failed component; wherein the energy storage is configured to store between about a tenth of a joule and about one hundred kilojoules of energy, and to provide peak power of between about one watt and about one hundred kilowatts, for at least two charge-discharge cycles.

2. The power system of claim 1, further comprising a second subsystem controller that is operative to control a second subsystem.

3. The power system of claim 2, wherein the first subsystem controller and the second subsystem controller are combined to form at least a part of a control circuit.

4. The power system of claim 1, wherein the first subsystem comprises measurement apparatus that is operative to determine a need for depassivation.

5. The power system of claim 1, wherein the first subsystem is configured to provide at least two modes of operation.

6. The power system of claim 5, wherein the first subsystem for switching between two modes of operation is configured according to temperature.

7. The power system of claim 6, wherein the first subsystem for switching between two modes of operation includes at least one transistor or relay for switching passive components.

8. The power system of claim 1, wherein the first subsystem is configured to provide for control of a voltage output from the power system.

9. The power system of claim 1, wherein the first subsystem is configured to provide for control of a current output from the power system.

10. The power system of claim 1, wherein the first subsystem is configured to provide for control of a maximum current output from the power system.

11. The power system of claim 1, wherein the first subsystem is arranged to be configured by way of a remote signal.

12. The power system of claim 1, wherein the first subsystem is arranged to be configured by way of a user-generated signal.

13. The power system of claim 1, wherein the first subsystem is configured to provide for deactivation of a circuit.

14. The power system of claim 1, wherein the first subsystem is configured to provide for limiting a voltage output from the power system.

15. The power system of claim 1, wherein the first subsystem is configured to provide for limiting a current output from the power system.

16. The power system of claim 1, wherein the first subsystem is configured to provide for control according to temperature.

17. The power system of claim 1, control according to vibration.

18. A method of fabricating a power system for a logging instrument comprising:
   selecting a rechargeable energy storage that is operable in a temperature range of between about minus forty degrees Celsius and about two hundred and ten degrees Celsius coupled to a circuit for at least one of supplying power from the energy storage and charging the energy storage;

wherein the rechargeable energy storage comprises:
- an energy storage;
- a power supply; where the power supply is configured to supply energy from an energy storage to a logging instrument;
- a first subsystem controller;
- a first subsystem that is operative to provide a current draw for battery depassivation; where the first subsystem controller is configured to control the first subsystem; and
  - an automatic bypass; where the automatic bypass determines a failed state for a component of the power system and reroutes power from the energy storage around the failed component; wherein the energy storage is configured to store between about a tenth of a joule and about one hundred kilojoules of energy, and to provide peak power of between about one watt and about one hundred kilowatts, for at least two charge-discharge cycles.

* * * * *